United States Patent
Ishihara et al.

(10) Patent No.: US 8,849,702 B2
(45) Date of Patent: Sep. 30, 2014

(54) INFORMATION PROCESSING APPARATUS, INFORMATION PROCESSING METHOD, AND IMAGE FORMING APPARATUS

(75) Inventors: Hiroshi Ishihara, Tokyo (JP); Keiichi Suzuki, Tokyo (JP); Michihiko Tsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 151 days.

(21) Appl. No.: 13/201,292

(22) PCT Filed: Jan. 25, 2010

(86) PCT No.: PCT/JP2010/051302
§ 371 (c)(1),
(2), (4) Date: Aug. 12, 2011

(87) PCT Pub. No.: WO2010/103877
PCT Pub. Date: Sep. 16, 2010

(65) Prior Publication Data
US 2011/0295695 A1    Dec. 1, 2011

(30) Foreign Application Priority Data

Mar. 13, 2009  (JP) ................................. 2009-062055
Mar. 13, 2009  (JP) ................................. 2009-062057

(51) Int. Cl.
G06F 15/16      (2006.01)
G06F 17/30      (2006.01)
G06F 3/12       (2006.01)
G06Q 30/04      (2012.01)
G06Q 30/02      (2012.01)
G06Q 40/00      (2012.01)

(52) U.S. Cl.
CPC ............ *G06Q 30/04* (2013.01); *G06Q 30/0269* (2013.01); *G06Q 40/12* (2013.01)

USPC ........... 705/14.66; 705/76; 706/57; 709/208; 709/224; 358/1.15; 358/1.1

(58) Field of Classification Search
None
See application file for complete search history.

(56) References Cited

U.S. PATENT DOCUMENTS

2002/0078160 A1*  6/2002  Kemp et al. ................. 709/208
2004/0236862 A1  11/2004  Ito et al.
(Continued)

FOREIGN PATENT DOCUMENTS

JP    2002 373175    12/2002
JP    2003-67647 A    3/2003
(Continued)

OTHER PUBLICATIONS

Russian Office Action issued Oct. 18, 2012, in Russia Patent Application No. 2011137451 (with English translation).
(Continued)

Primary Examiner — Marivelisse Santiago Cordero
Assistant Examiner — Daryl Jackson
(74) Attorney, Agent, or Firm — Oblon, Spivak, McClelland, Maier & Neustadt, L.L.P.

(57) ABSTRACT

An information processing apparatus includes a receiving unit configured to receive a utilization request for one of plural services provided by a computer; a service attribute information storage unit configured to store service attribute information of each of the services, the service attribute information including information indicating a type of the service and information indicating an evaluation of a content of the service; and a service recommending unit configured to search the service attribute information storage unit for the service attribute information corresponding to the type of the requested service, and determine a utilization-recommended service based on the evaluation information in the service attribute information retrieved from the service attribute information storage unit.

12 Claims, 37 Drawing Sheets

(56) References Cited

U.S. PATENT DOCUMENTS

| | | |
|---|---|---|
| 2004/0243477 A1 | 12/2004 | Mathai et al. |
| 2004/0260657 A1 | 12/2004 | Cockerham |
| 2005/0226641 A1 | 10/2005 | Ando et al. |
| 2007/0077164 A1 | 4/2007 | Hammond et al. |
| 2007/0192300 A1 | 8/2007 | Reuther et al. |
| 2009/0077164 A1 | 3/2009 | Phillips et al. |

FOREIGN PATENT DOCUMENTS

| | | |
|---|---|---|
| JP | 2004-199513 A | 7/2004 |
| JP | 2005 269619 | 9/2005 |
| JP | 2005 327128 | 11/2005 |
| JP | 3127197 U | 11/2006 |
| JP | 2008-204270 | 9/2008 |
| JP | 2008-276437 | 11/2008 |
| JP | 2008-295027 A | 12/2008 |
| JP | 2009 17592 | 1/2009 |

OTHER PUBLICATIONS

Office Action issued Feb. 12, 2013 in Japanese patent Application No. 2009-062057.

Office Action issued Aug. 27, 2013, in Japanese Patent Application No. 2009-062055.

Office Action issued Nov. 26, 2013 in Japanese Patent Application No. 2009-062055.

International Search Report issued May 18, 2010 in PCT/JP10/51302 filed Jan. 25, 2010.

* cited by examiner

FIG.6

| SERVICE ID | TYPE ID | PROVIDER NAME | SERVICE CATEGORY | EXPI-RATION DATE | ADDRESS INFO | INTERFACE INFO | QUALITY (Q) | COST (C) | DELIVERY (D) |
|---|---|---|---|---|---|---|---|---|---|
| ocrsoft | OCR | OCR SOFTWARE | LOCAL APPLICATION | | /xxx/xxx | ······ | 5 | 10 | 10 |
| transsoft | TRANSLATION | TRANSLATION SOFTWARE | LOCAL APPLICATION | | /xxx/xxx | ······ | 6 | 10 | 10 |
| ocrserv | OCR | OCR SERVICE APPLICATION | Web SERVICE | ... | http:/xxx/xxx | ······ | 7 | 5 | 8 |
| transserv | TRANSLATION | TRANSLATION SERVICE APPLICATION | Web SERVICE | | http:/yyy/yyy | ······ | 10 | 6 | 8 |
| scan001 | SCAN | SCAN APPLICATION | MFP | | xxx.xxx.xxx.xxx | ······ | 10 | 10 | 10 |
| ocr002 | OCR | OCR APPLICATION | MFP | | xxx.xxx.xxx.xxx | ······ | 10 | 10 | 9 |
| trans003 | TRANSLATION | TRANSLATION APPLICATION | MFP | | xxx.xxx.xxx.xxx | ······ | 8 | 10 | 9 |
| .. | .. | .. | .. | .. | .. | .. | .. | .. | .. |

| SERVICE ID | TYPE ID | PROVIDER NAME |
|---|---|---|
| scan001 | SCAN | SCAN APPLICATION |
| ocr002 | OCR | OCR APPLICATION |
| transserv | TRANSLATION | TRANSLATION SERVICE APPLICATION |

FIG.9

| WIDGET ID | | | scan001 | | |
|---|---|---|---|---|---|
| USER ID | | | USER A | | |
| WIDGET ADDRESS | | | http://xxx/xxx/yyy | | |
| WIDGET NAME | | | SCAN TRANSLATION WIDGET | | |
| SERVICE UTILIZATION INFO | SERVICE ID | TYPE ID | PROVIDER NAME | SETTING INFO | |
| | scan001 | SCAN | SCAN APPLICATION | ..... | |
| | ocr002 | OCR | OCR APPLICATION | ..... | |
| | transserv | TRANSLATION | TRANSLATION SERVICE APPLICATION | ..... | |

FIG.10

| USER ID | APPLICATION INFO ACQUIRING URL |
|---------|-------------------------------|
| USER A  | http://xxxxxx                 |
| USER B  | ...                           |

| WIDGET ID | scan001 | | | |
|---|---|---|---|---|
| USER ID | USER A | | | |
| WIDGET ADDRESS | http://xxx/xxx/yyy | | | |
| WIDGET NAME | SCAN TRANSLATION WIDGET | | | |
| SERVICE UTILIZATION INFO | SERVICE ID | TYPE ID | PROVIDER NAME | SETTING INFO |
| | scan001 | SCAN | SCAN APPLICATION | ...... |
| | ocr002 | OCR | OCR APPLICATION | ...... |
| | transserv | TRANSLATION | TRANSLATION SERVICE APPLICATION | ...... |
| WIDGET RELAYING URL | http://yyyyyyyy | | | |

| SERVICE ID | TYPE ID | PROVIDER NAME | SERVICE CATEGORY | EXPIRATION DATE | ADDRESS INFO | INTERFACE INFO | LOWER-LEVEL MODULE | QUALITY (Q) | COST (C) | DELIVERY (D) |
|---|---|---|---|---|---|---|---|---|---|---|
| ocrsoft | OCR | OCR SOFTWARE | LOCAL APPLICATION | | /xxx/xxx | ...... | | 5 | 10 | 10 |
| transsoft | TRANSLATION | TRANSLATION SOFTWARE | LOCAL APPLICATION | | /xxx/xxx | ...... | | 6 | 10 | 10 |
| ocrserv | OCR | OCR SERVICE APPLICATION | Web SERVICE | | http:/xxx/xxx | ...... | | 7 | 5 | 8 |
| transserv | TRANSLATION | TRANSLATION SERVICE APPLICATION | Web SERVICE | ... | http:/yyy/yyy | ...... | | 8 | 6 | 8 |
| scan001 | SCAN | SCAN APPLICATION | MFP | | xxx.xxx.xxx.xxx | ...... | | 10 | 10 | 10 |
| ocr002 | OCR | OCR APPLICATION | MFP | | xxx.xxx.xxx.xxx | ...... | ocr002. thresholdA ocr002. lineA | 10 | 10 | 9 |
| trans003 | TRANSLATION | TRANSLATION APPLICATION | MFP | | xxx.xxx.xxx.xxx | ...... | | 8 | 10 | 9 |
| ocr002. thresholdA | THRESHOLD | THRESHOLDING MODULE A | MFP | | ...... | | | 7 | 10 | 7 |
| ocr002. lineA | LINE | LINE RECOGNITION MODULE A | MFP | | ...... | | | 6 | 10 | 5 |
| ocr002. thresholdB | THRESHOLD | THRESHOLDING MODULE B | MFP | | ...... | | | 8 | 10 | 9 |
| ocr002. lineB | LINE | LINE RECOGNITION MODULE B | MFP | | ...... | | | 9 | 10 | 8 |
| .. | .. | .. | .. | .. | .. | .. | | .. | .. | .. |

FIG.19

| SERVICE ID | TYPE ID | PROVIDER NAME |
|---|---|---|
| scan001 | SCAN | SCAN APPLICATION |
| ocr002 | OCR | OCR APPLICATION |
| ocr002.thresholdB | THRESHOLD | THRESHOLDING MODULE B |
| ocr002.lineB | LINE | LINE RECOGNITION MODULE B |
| transserv | TRANSLATION | TRANSLATION SERVICE APPLICATION |

FIG.20

| WIDGET ID | | scan001 | |
|---|---|---|---|
| USER ID | | USER A | |
| WIDGET ADDRESS | | http://xxx/xxx/yyy | |
| WIDGET NAME | | SCAN TRANSLATION WIDGET | |
| SERVICE UTILIZATION INFO | SERVICE ID | TYPE ID | PROVIDER NAME | SETTING INFO |
| | scan001 | SCAN | SCAN APPLICATION | ...... |
| | ocr002 | OCR | OCR APPLICATION | ...... |
| | ocr002.thresholdB | THRESHOLD | THRESHOLDING MODULE B | |
| | ocr002.lineB | LINE | LINE RECOGNITION MODULE B | |
| | transserv | TRANSLATION | TRANSLATION SERVICE APPLICATION | ...... |

FIG.21

| SERVICE ID | TYPE ID | PROVIDER NAME |
|---|---|---|
| scan001 | SCAN | SCAN APPLICATION |
| ocr002 | OCR | OCR APPLICATION |
| transsoft | TRANSLATION | TRANSLATION SOFTWARE |

FIG.23

| WIDGET ID | scan001 | | |
|---|---|---|---|
| USER ID | USER A | | |
| WIDGET ADDRESS | http://xxx/xxx/yyy | | |
| WIDGET NAME | SCAN TRANSLATION WIDGET | | |
| SERVICE UTILIZATION INFO | SERVICE ID | TYPE ID | PROVIDER NAME | SETTING INFO |
| | scan001 | SCAN | SCAN APPLICATION | ...... |
| | ocr002 | OCR | OCR APPLICATION | ...... |
| | transsoft | TRANSLATION | TRANSLATION SOFTWARE | ...... |
| WIDGET RELAYING URL | http://yyyyyyyyy | | |

FIG.24

| SERVICE ID | TYPE ID | PROVIDER NAME | SERVICE CATEGORY | EXPI- RATION DATE | ADDRESS INFO | INTERFACE INFO | QUALITY (Q) | COST (C) | DELIVERY (D) |
|---|---|---|---|---|---|---|---|---|---|
| ocrsoft | OCR | OCR SOFTWARE | LOCAL APPLICATION | | /xxx/xxx | ……… | 5 | 10 | 10 |
| transsoft | TRANSLATION | TRANSLATION SOFTWARE | LOCAL APPLICATION | | /xxx/xxx | ……… | 6 | 10 | 10 |
| ocrserv | OCR | OCR SERVICE APPLICATION | Web SERVICE | | http:/xxx/xxx | ……… | 7 | 5 | 8 |
| scan001 | SCAN | SCAN APPLICATION | MFP | | xxx.xxx.xxx.xxx | ……… | 10 | 5 | 10 |
| ocr002 | OCR | OCR APPLICATION | MFP | | xxx.xxx.xxx.xxx | ……… | 10 | 5 | 9 |
| trans003 | TRANSLATION | TRANSLATION APPLICATION | MFP | | xxx.xxx.xxx.xxx | ……… | 10 | 6 | 8 |
| ‥ | ‥ | ‥ | ‥ | ‥ | ‥ | ‥ | ‥ | ‥ | ‥ |

| SERVICE ID | TYPE ID | PROVIDER NAME |
|---|---|---|
| scan001 | SCAN | SCAN APPLICATION |
| ocrsoft | OCR | OCR SOFTWARE |
| trans003 | TRANSLATION | TRANSLATION APPLICATION |

FIG.27

| WIDGET ID | scan001 | | |
|---|---|---|---|
| USER ID | USER A | | |
| WIDGET ADDRESS | http://xxx/xxx/yyy | | |
| WIDGET NAME | SCAN TRANSLATION WIDGET | | |
| SERVICE UTILIZATION INFO | SERVICE ID | TYPE ID | PROVIDER NAME | SETTING INFO |
| | scan001 | SCAN | SCAN APPLICATION | ...... |
| | ocrsoft | OCR | OCR SOFTWARE | ...... |
| | trans003 | TRANSLATION | TRANSLATION APPLICATION | ...... |
| WIDGET RELAYING URL | http://yyyyyyyyy | | |

FIG.30

| SERVICE ID | TYPE ID | ADVERTISEMENT INFO |
|---|---|---|
| trans003 | TRANSLATION | ......... |
| : | : | : |

| SERVICE ID | TYPE ID | PROVIDER NAME | SERVICE CATEGORY | EXPIRATION DATE | ADDRESS INFO | INTERFACE INFO | QUALITY (Q) | COST (C) | DELIVERY (D) |
|---|---|---|---|---|---|---|---|---|---|
| ocrsoft | OCR | OCR SOFTWARE | LOCAL APPLICATION | | /xxx/xxx | ……… | 5 | 10 | 10 |
| transsoft | TRANSLATION | TRANSLATION SOFTWARE | LOCAL APPLICATION | | /xxx/xxx | ……… | 6 | 10 | 10 |
| ocr002 | OCR | OCR APPLICATION | Web SERVICE | ……… | xxx.xxx.xxx.xxx | ……… | 10 | 10 | 9 |
| trans003 | TRANSLATION | TRANSLATION APPLICATION | Web SERVICE | ……… | xxx.xxx.xxx.xxx | ……… | 8 | 10 | 9 |
| scan001 | SCAN | SCAN APPLICATION | MFP | | xxx.xxx.xxx.xxx | ……… | 10 | 10 | 10 |
| .. | .. | .. | .. | .. | .. | .. | .. | .. | .. |

| WIDGET ID | scan001 | | | |
|---|---|---|---|---|
| USER ID | USER A | | | |
| WIDGET ADDRESS | http://xxx/xxx/yyy | | | |
| WIDGET NAME | SCAN TRANSLATION WIDGET | | | |
| SERVICE UTILIZATION INFO | SERVICE ID | TYPE ID | PROVIDER NAME | SETTING INFO |
| | scan001 | SCAN | SCAN APPLICATION | ...... |
| | ocr002 | OCR | OCR SOFTWARE | ...... |
| | trans003 | TRANSLATION | TRANSLATION APPLICATION | ...... |
| WIDGET RELAYING URL | http://yyyyyyyyy | | | |

FIG.37

| SERVICE ID | TYPE ID | PROVIDER NAME | ADVERTISEMENT INFO | NUMBER OF TIMES OF EXTERNAL UTILIZATION |
|---|---|---|---|---|
| ocr002 | OCR | OCR APPLICATION | ......... | 5 |
| trans003 | TRANSLATION | TRANSLATION APPLICATION | ......... | 7 |
| .. | .. | | .. | .. |

144

INFORMATION PROCESSING APPARATUS, INFORMATION PROCESSING METHOD, AND IMAGE FORMING APPARATUS

TECHNICAL FIELD

The present invention relates to information processing apparatuses, information processing methods, and image forming apparatuses.

BACKGROUND ART

Various services, such as Web services, are being provided over networks and may be called from within a program (see Japanese Laid-Open Patent Application No. 2009-017592, for example). By utilizing such existing services, a program developer may be able to develop programs with an improved efficiency. Because the existing services can be expected to provide generally stable quality, program developers can develop stable programs by utilizing such services and offer them to users.

Also, in some image forming apparatuses generally referred to as multifunction peripherals (MFPs), a new application can be developed or installed by utilizing a published application program interface (API), for example, after shipping (see Japanese Laid-Open Patent Application No. 2005-269619, for example). In such an image forming apparatus, not only the applications developed by the vendor of the image forming apparatus, but also applications developed by a third-party vendor can be installed. Thus, the functional extensibility of the image forming apparatus is significantly increased, enabling the seller of the image forming apparatus to create a new business model by utilizing the extended functionality.

Such third-party-vendor developed applications may also facilitate coordination between the image forming apparatus and other computers. For example, a service provider may decide to coordinate its own computer system with an image forming apparatus in a business partnership with a seller of the image forming apparatus, thereby increasing the potential for creating a new business model.

However, with regard to the utilization of existing services via a network, if the relationship between the program and the service that the program calls is static, the program may not be able to utilize a new, higher-functionality service of the same kind as the original service because the program has to be rewritten in order to utilize the new service. On the other hand, if the relationship between the program and the service is dynamic, the service that the program utilizes may be replaced with another service relatively easily. However, it has been difficult to define a standard for selecting an optimum service. Furthermore, the replacement of services involves complicated information defining the program and the services, which information are difficult for a user to manually modify.

With regard to the creation of new business models by utilizing the API, one important question is how to achieve revenue. In a business model utilizing a computer system, an appropriate mechanism for ensuring revenue should be implemented within the computer system. It is also desirable that the computer system implement a mechanism for enabling distribution of the revenue among business partners in an easy and clear manner.

DISCLOSURE OF INVENTION

The disadvantages of the prior art may be overcome by the present invention which, in one aspect, is an information processing apparatus that includes a receiving unit configured to receive a utilization request for one of plural services provided by a computer; a service attribute information storage unit configured to store service attribute information of each of the services, the service attribute information including information indicating a type of service and information indicating an evaluation of a content of the service; and a service recommending unit configured to search the service attribute information storage unit for the service attribute information corresponding to the type of the requested service, and determine a utilization-recommended service based on the evaluation information in the service attribute information retrieved from the service attribute information storage unit.

In another aspect of the present invention, an information processing method performed by an information processing apparatus includes receiving a utilization request for one of plural services provided by a computer; storing service attribute information of each of the services in a service attribute information storage unit of the information processing apparatus, the service attribute information including information indicating a type of the service and information indicating an evaluation of a content of the service; searching the service attribute information storage unit for the service attribute information of a type corresponding to the type of the requested service; and determining a utilization-recommended service based on the evaluation information in the service attribute information retrieved from the service attribute information storage unit.

In another aspect of the present invention, an image forming apparatus includes a service attribute information storage unit configured to store service attribute information of each of plural services that can be provided by the image forming apparatus, the service attribute information including identifying information; a service attribute information providing unit configured to transmit, in response to a request from an information processing apparatus with which the image forming apparatus can communicate, the identifying information stored in the service attribute information storage unit to the information processing apparatus; a service request receiving unit configured to receive a service execution request including the identifying information from the information processing apparatus; a service control unit configured to control an execution of the service identified by the identifying information included in the service execution request; and a billing unit configured to record billing information corresponding to a number of the services executed in a billing information storage unit.

BRIEF DESCRIPTION OF THE DRAWINGS

FIG. 6 illustrates an example of profile data registered in a profile data managing unit of the widget manager according to the first embodiment;

FIG. 8 illustrates an example of the result of determination of a recommended service according to the first embodiment;

FIG. 9 illustrates an example of widget information of a scan translation widget according to the first embodiment;

FIG. 10 illustrates an example of a user managing table;

FIG. 13 illustrates an example of widget information of a scan translation widget that is transmitted from the widget manager to the provider application according to the first embodiment;

FIG. 17 illustrates an example of profile data registered in a profile data managing unit of the widget manager according to the second embodiment;

FIG. 19 illustrates an example of the result of determination of a recommended service according to the second embodiment;

FIG. 20 illustrates an example of widget information of a scan translation widget according to the second embodiment;

FIG. 21 illustrates an example of the result of determination of a recommended service according to a third embodiment of the present invention;

FIG. 23 illustrates an example of widget information of a scan translation widget that is transmitted from the widget manager to the provider application in the third embodiment;

FIG. 24 illustrates an example of profile data registered in a profile data managing unit of the widget manager according to the fourth embodiment;

FIG. 25 illustrates an example of the result of determination of a recommended service according to a fourth embodiment of the present invention;

FIG. 27 illustrates an example of widget information of a scan translation widget that is transmitted from the widget manager to the provider application according to the fourth embodiment;

FIG. 30 illustrates an example of advertisement attribute information in an advertisement attribute information managing unit;

FIG. 33 illustrates an example of profile data registered in a profile data managing unit of the widget manager according to the sixth embodiment;

FIG. 36 illustrates an example of widget information of a scan translation widget that is transmitted from the widget manager to a provider application according to the sixth embodiment; and FIG. 37 illustrates an example of SDK service information in a SDK service information managing unit.

BEST MODE OF CARRYING OUT THE INVENTION

Embodiment 1

Figure 1:
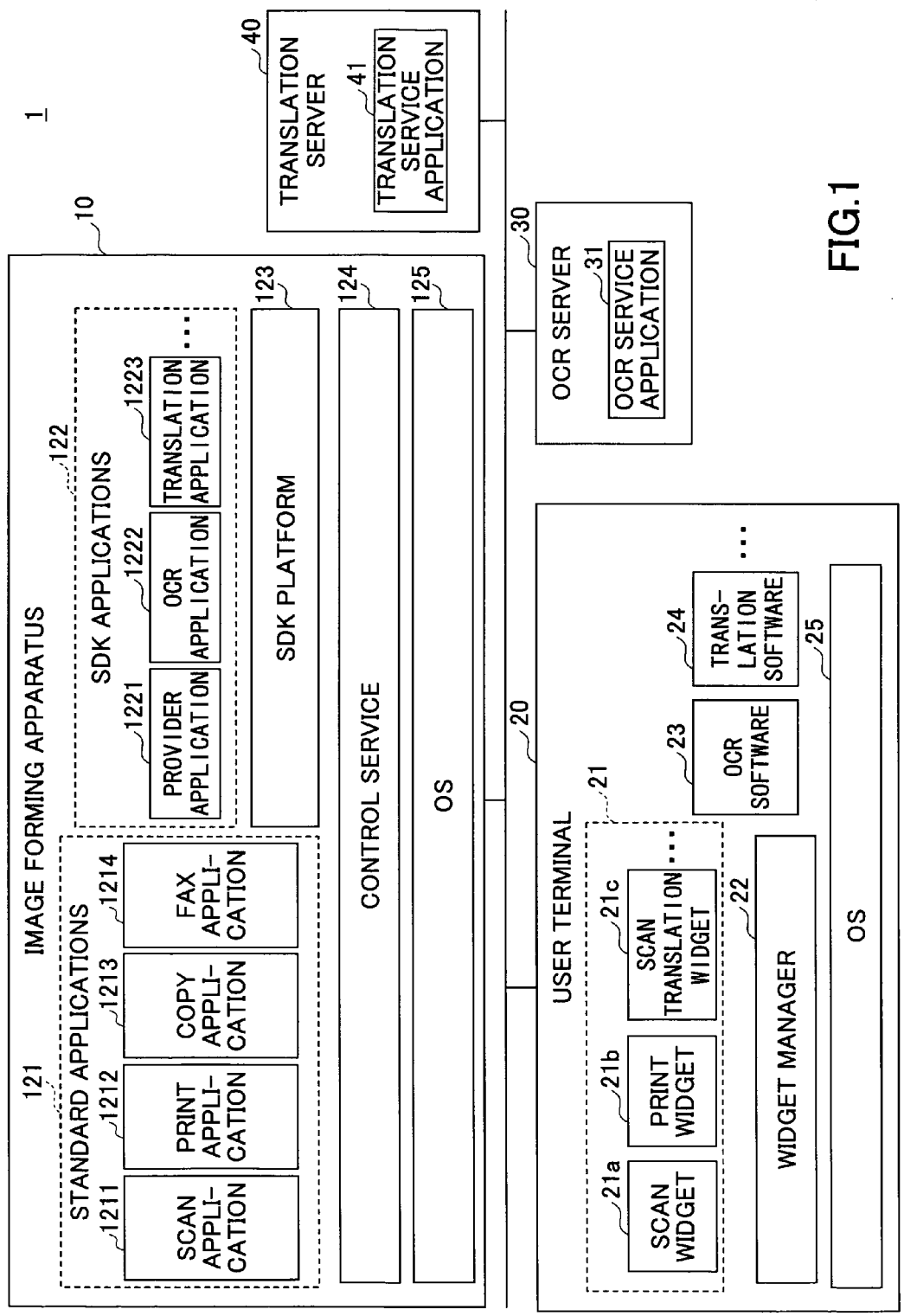
FIG. 1 is a block diagram of an information processing system according to a first embodiment of the present invention.

With reference to the attached drawings, embodiments of the present invention are described. FIG. 1 is a block diagram of an information processing system 1 according to a first embodiment of the present invention. The information processing system 1 includes an image forming apparatus 10, a user terminal 20, an OCR server 30, and a translation server 40, which are connected via a network, such as a LAN (Local Area Network) or the Internet, either in a wired or wireless manner.

The image forming apparatus 10 may be a multifunction peripheral (MFP) that realizes the functions of a printer, a scanner, a copier, and/or a facsimile. The image forming apparatus 10 may also be provided by a single-function apparatus, such as a printer, a scanner, a copier, or a facsimile. The user terminal 20 is a personal terminal utilized by a user in which a software program may be installed or run. The user terminal 20 has a communication function. Examples of the user terminal 20 include a desktop PC (Personal Computer), a notebook PC, a PDA (Personal Digital Assistant), and a cell phone. The OCR server 30 is a computer having an OCR service application 31. The OCR service application 31 is an application program for providing an OCR (Optical Character Recognition) function via a network as a Web service (translation service). The translation server 40 is a computer having a translation service application 41. The translation service application 41 is an application program for providing a document data translation function (for translating from English to Japanese, for example) via the network as a Web service (translation service).

A software structure of the user terminal 20 is described with reference to FIG. 1. The user terminal 20 includes a widget 21, a widget manager 22, an OCR software 23, a translation software 24, and an OS (operating system) 25. The widget 21 includes a scan widget 21a, a print widget 21b, and a scan translation widget 21c. The "widgets", or "gadgets" are simple applications that have been available in recent years. In accordance with the present embodiment, these application programs are referred to as "widgets" merely because they can be easily installed and utilized (i.e., the term "widget" is not intended to limit these application programs in any technical sense). However, in accordance with the present embodiment, the individual widgets share the common property that they realize predetermined functions (such as processing a process flow, such as a work flow) by utilizing one or more services provided via the network or in the user terminal 20.

The scan widget 21a causes the image forming apparatus 10 to scan image data. The scanned image data may be stored in the user terminal 20. The print widget 21b causes the image forming apparatus 10 to print document data stored in the user terminal 20. The scan translation widget 21c causes the image forming apparatus 10 to scan image data, subject the scanned image data to an OCR process, and translate OCRed text data. The OCR process and the translation process may utilize services provided over the network (either by the image forming apparatus 10, the OCR server 30, or the translation server 40), or by the user terminal 20 (the OCR software 23 or the translation software 24). The widget manager 22, which provides a framework for the widget 21, may be configured to provide a communication interface between the widget 21 and the image forming apparatus 10. Each widget 21 needs to have an interface and a process sequence defined by the widget manager 22 so that the widget 21 can operate in coordination with the widget manager 22.

The OCR software 23 provides an OCR (Optical Character Recognition) function and may include commercially available software. The OCR software 23 may be configured to provide the OCR service to the widget 21 via inter-process communication. The translation software 24 may be provided by commercially available translation software. The translation software 24 may provide a translation service to the widget 21 via inter-process communication. The OS 25 provides the so-called operating system, on which various software in the user terminal 20 may be operated as processes or threads.

Referring to FIG. 1, a software structure of the image forming apparatus 10 is described. The image forming apparatus 10 includes a standard application 121, a SDK (software development kit) application 122, a SDK platform 123, a control service 124, and an OS 125. The standard application 121 includes a set of applications that are implemented on the image forming apparatus 10 as standard (upon shipping). The applications may include a scan application 1211, a print application 1212, a copy application 1213, and a FAX application 1214. The scan application 1211 is used for executing a scan job. The print application 1212 is used for executing a print job. The copy application 1213 is used for executing a copy job. The FAX application 1214 is used for executing a FAX transmission or reception job.

The control service 124 may include software modules for providing higher-level applications with functions for controlling various hardware resources. Examples of the functions include a network communication-related function, a scanner control function, a printer control function, and a memory managing function. The SDK application 122 is an application that is additionally installed as a plugin after shipping of the image forming apparatus 10, in order to expand the functionality of the image forming apparatus 10. The SDK application 122 may include a provider application 1221, an OCR application 1222, and a translation application 1223. The provider application 1221 may be used for executing a process for enabling the widget 21 to be operated from the image forming apparatus 10. The OCR application 1222 may be used for executing an OCR process. The translation application 1223 may be used for executing a translation process.

The SDK platform 123 provides an environment for executing the SDK application 122. The SDK application 122 is developed by utilizing an API (Application Program Interface) provided by the SDK platform 123. For example, the SDK platform 123 provides the SDK application 122 with an interface for utilizing the scan function, the print function, or the copy function. The API of the SDK platform 123 is published, so that the SDK application 122 may be developed by a third-party vendor. The OS 125 provides an operating system on which various software in the image forming apparatus 10 may be operated as processes or threads.

Figure 2:
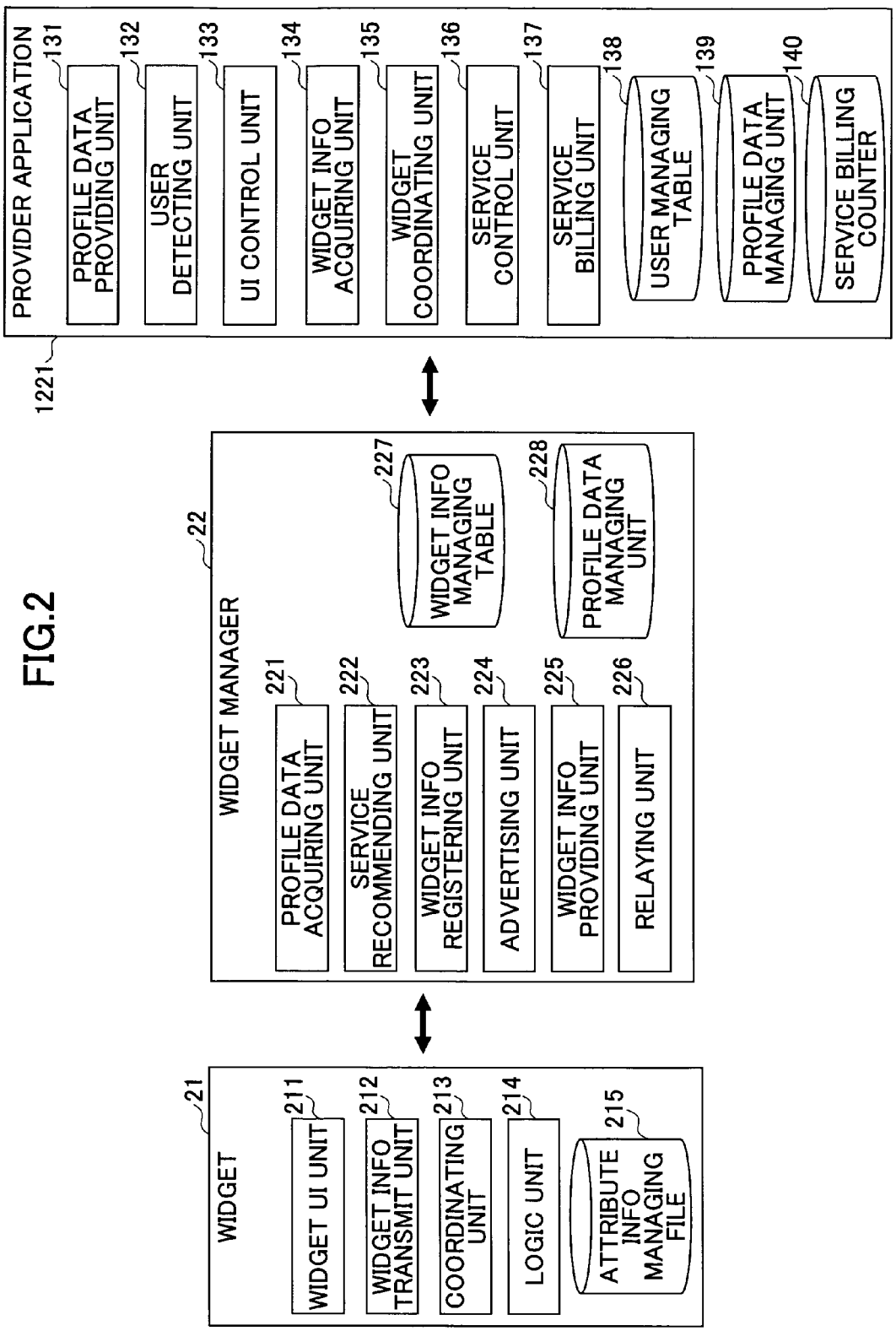
FIG. 2 is a block diagram illustrating a functional structure of a widget, a widget manager, and a provider application according to the first embodiment.

With reference to FIG. 2, the widget 21, the widget manager 22, and the provider application 1221 are described in detail. The widget 21 includes a widget UI unit 211, a widget information transmitting unit 212, a coordinating unit 213, a logic unit 214, and an attribute information managing file 215. The widget UI unit 211 may be configured to enable the display of various display screens concerning the widget 21 on a display device of the user terminal 20. The widget information transmitting unit 212 transmits a widget information registration request to the widget manager 22 when the widget 21 is started up. Widget information includes information necessary for the execution of the widget 21. The coordinating unit 213 controls communications (including the exchange of information) for coordination with the provider application 1221. The attribute information managing file 215 is a file for storing setting information and the like for the widget 21. The logic unit 214 implements the specific function of each widget 21.

The widget manager 22 includes a profile data acquiring unit 221, a service recommend unit 222, a widget information registration unit 223, an advertising unit 224, a widget information providing unit 225, a relaying unit 226, a widget information managing table 227, and a profile data managing unit 228. The profile data acquiring unit 221 searches the image forming apparatus 10 with which communication can be established in order to acquire profile data from the image forming apparatus 10. The profile data is generated for each service that the widget 21 can utilize, where attribute information of the service is recorded in the profile data. The image forming apparatus 10 according to the present embodiment is configured to provide plural services (including scan, print, copy, FAX, OCR, and translation services). Therefore, plural items of profile data are acquired from the image forming apparatus 10. The acquired profile data are registered in the profile data managing unit 228 by the profile data acquiring unit 221. In accordance with the present embodiment, the services utilized by the widget 21 are identified by at least a combination of the type of service (provided function) and the provider of the service (service provider). Thus, separate profile data items may be generated for the same type of service (providing the same function) if the service providers are different.

The profile data managing unit 228 provides a storage area in a storage unit of the user terminal 20 for storing profile data. In the profile data managing unit 228, profile data concerning programs (such as OCR software 23) that exist in the user terminal 20 and services provided via the network are registered, as well as the profile data acquired from the image forming apparatus 10. In response to a service utilization request from the service widget 21, the service recommend unit 222 determines an optimum service based on the profile data registered in the profile data managing unit 228. Multiple services may provide the same function (services of the same type) over the network and in the user terminal 20. Thus, the widget 21 can learn, via the service recommend unit 222, an optimum service from among the plural services of the same type.

The widget information registration unit 223 receives a widget information registration request from the widget 21, and saves relevant widget information in the widget information managing table 227. The widget information managing table 227 is a table in which the widget information of each widget 21 operating in the user terminal 20 is registered. The widget information managing table 227 may be stored in a storage unit of the user terminal 20.

The advertising unit 224 may advertise via the network, either by broadcast or multicast, a user ID contained in the widget information received by the widget information registration unit 223. The advertisement may be issued on a user by user basis (i.e., on an user ID basis). Specifically, after an advertisement for user A is issued in response to the starting up of the widget 21 in the user terminal 20, no advertisement is issued based on the widget information of any other widget within the user terminal 20. In accordance with the present embodiment, for convenience sake, it is assumed that the user terminal 20 is associated with a user on a one-to-one basis. Thus, the advertisement generated by the advertising unit 224 provides information for notifying the image forming apparatus 10 that a new user has come into being who can utilize the widget 21. Alternatively, such advertisement may be issued on a widget information basis. In this case, redundant advertisements may be issued for the same user. Such redundancy may be eliminated at the image forming apparatus end.

The widget information providing unit 225, in response to a request from the image forming apparatus 10, provides (transmits) relevant widget information registered in the widget information managing table 227 to the image forming apparatus 10. The relaying unit 226 relays communication between the widget 21 and the provider application 1221.

The provider application 1221 includes a profile data providing unit 131, a user detecting unit 132, a UI control unit 133, a widget information acquiring unit 134, a widget coordinating unit 135, a service control unit 136, a service billing unit 137, a user managing table 138, a profile data managing unit 139, and a service billing counter 140. The profile data providing unit 131, in response to a profile data acquisition request from the widget manager 22, returns relevant profile data registered in the profile data managing unit 139. The profile data managing unit 139 provides a storage area in a storage unit of the image forming apparatus 10 for storing the profile data of each service that the image forming apparatus 10 can provide.

The user detecting unit 132 may detect, based on the advertisement issued by the widget manager 22, the presence of a user that can utilize the widget 21 and register the user ID and the like contained in the advertisement in the user managing table 138. The user managing table 138 is a table for managing a list of users who can utilize the widget 21 that exists on the network.

The UI control unit may receive an instruction and the like from a user for operating the widget 21. Namely, although the widget 21 is provided in the user terminal 20, the widget 21 can also be operated via an operating panel of the image forming apparatus 10, for example. The widget information acquiring unit 134 acquires from the widget manager 22 the widget information of the widget 21 that belongs to a user selected from among the users registered in the user managing table 138. The widget coordinating unit 135 controls communication with the widget 21. The service control unit 136 controls the execution of a service requested by the widget 21. A process for realizing a service may be delegated to the standard application 121 or the SDK application 122.

The service billing unit 137 updates the service billing counter 140 in accordance with an execution of a service by the service control unit 136. The service billing counter 140 may include a set of billing counters for the services that the image forming apparatus 10 can provide. For example, when the image forming apparatus 10 is configured to provide ten services, ten billing counters are included in the service billing counter 140. Namely, in accordance with the present embodiment, billing takes place for each service executed by the image forming apparatus 10 (i.e., the amount billed may depend on the number of the services executed).

Figure 3:
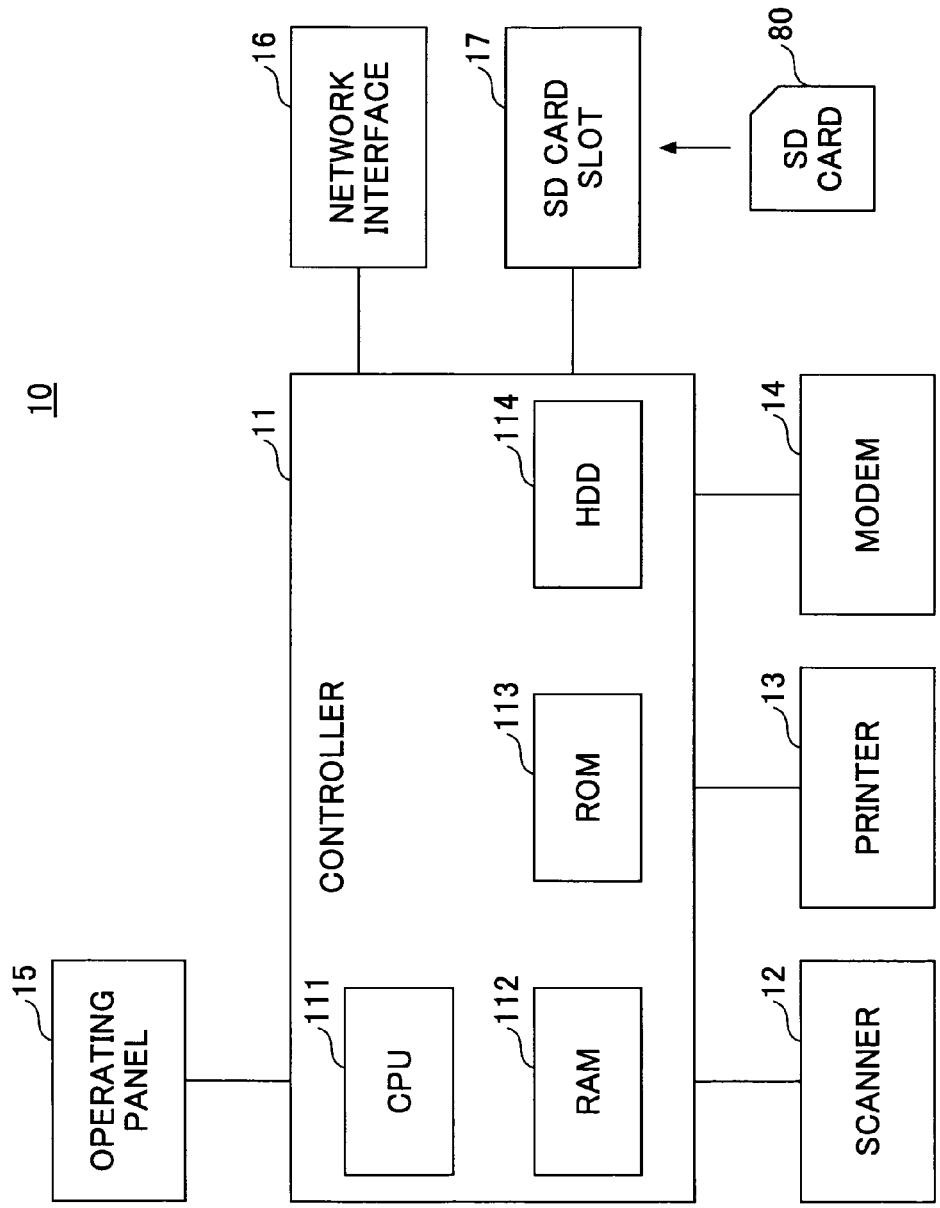
FIG. 3 is a block diagram of a hardware structure of the image forming apparatus according to the first embodiment.

With reference to FIG. 3, a hardware structure of the image forming apparatus 10 according to the first embodiment of the present invention is described. The hardware structure includes a controller 11, a scanner 12, a printer 13, a modem 14, an operating panel 15, a network interface 16, and a SD card slot 17. The controller 11 includes a CPU 111, a RAM (random access memory) 112, a ROM (read-only memory) 113, and a HDD (hard disk drive) 114. The ROM 113 may record various programs and data utilized by the programs. The RAM 112 may provide a storage area for loading of a program, or a work area for the loaded program. The CPU 111 may realize various functions of the image forming apparatus 10 by processing a program loaded in the RAM 112. The HDD 114 may record various programs and data utilized by the programs.

The scanner 12 may be configured to read image data from a manuscript. The printer 13 may be configured to print data on a printing sheet. The modem 14 may be configured to connect the image forming apparatus 10 to a telephone line in order to transmit or receive image data via facsimile. The operating panel 15 may include an input unit, such as a button for receiving inputs from a user, and a display unit, such as a liquid crystal panel. The network interface 16 may be configured to connect the image forming apparatus 10 with a network such as a LAN (which may be either wired or wireless). The SD card slot 17 is utilized for reading a program recorded in an SD card 80. Thus, in the image forming apparatus 10, not only the program recorded in the ROM 113 but also the program recorded in the SD card 80 may be loaded onto the RAM 112 and then executed.

Figure 4:
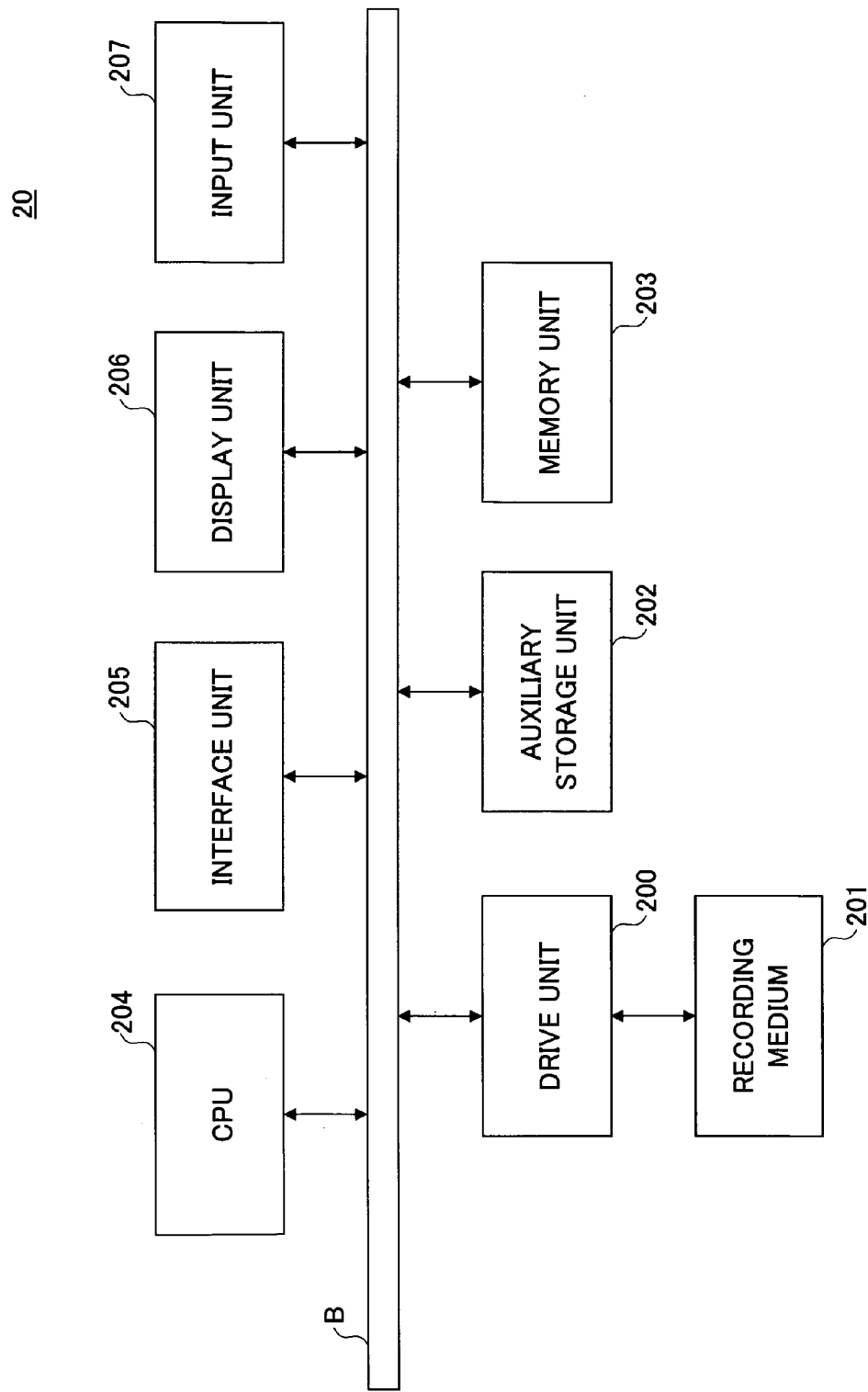
FIG. 4 is a block diagram of a hardware structure of a user terminal according to the first embodiment.

FIG. 4 is a block diagram of a hardware structure of the user terminal 20 according to the present embodiment. The user terminal 20 includes a drive unit 200, an auxiliary storage unit 202, a memory unit 203, a CPU 204, an interface device 205, a display device 206, and an input unit 207, which are connected via a bus B. A program for realizing a process in the user terminal 20 may be recorded in the recording medium 201, such as a CD-ROM or a memory card. When the recording medium 201 is set on the drive unit 200, the program is read by the drive unit 200 from the recording medium 201 and then installed in the auxiliary storage unit 202. Alternatively, such a program may be downloaded from another computer via the network. The installed program is then stored in the auxiliary storage unit 202, where relevant files or data may also be stored. The memory unit 203, in response to an instruction for starting up a program, reads the program from the auxiliary storage unit 202 and saves the program. The CPU 204 may realize a function of the user terminal 20 in accordance with the program saved in the memory unit 203. The interface device 205 may provide an interface for connecting the image forming apparatus 20 with the network. The display device 206 may display a GUI (Graphical User Interface) screen in accordance with a program. The input unit 207 may include a keyboard or buttons for the input of various operating instructions.

Figure 5:
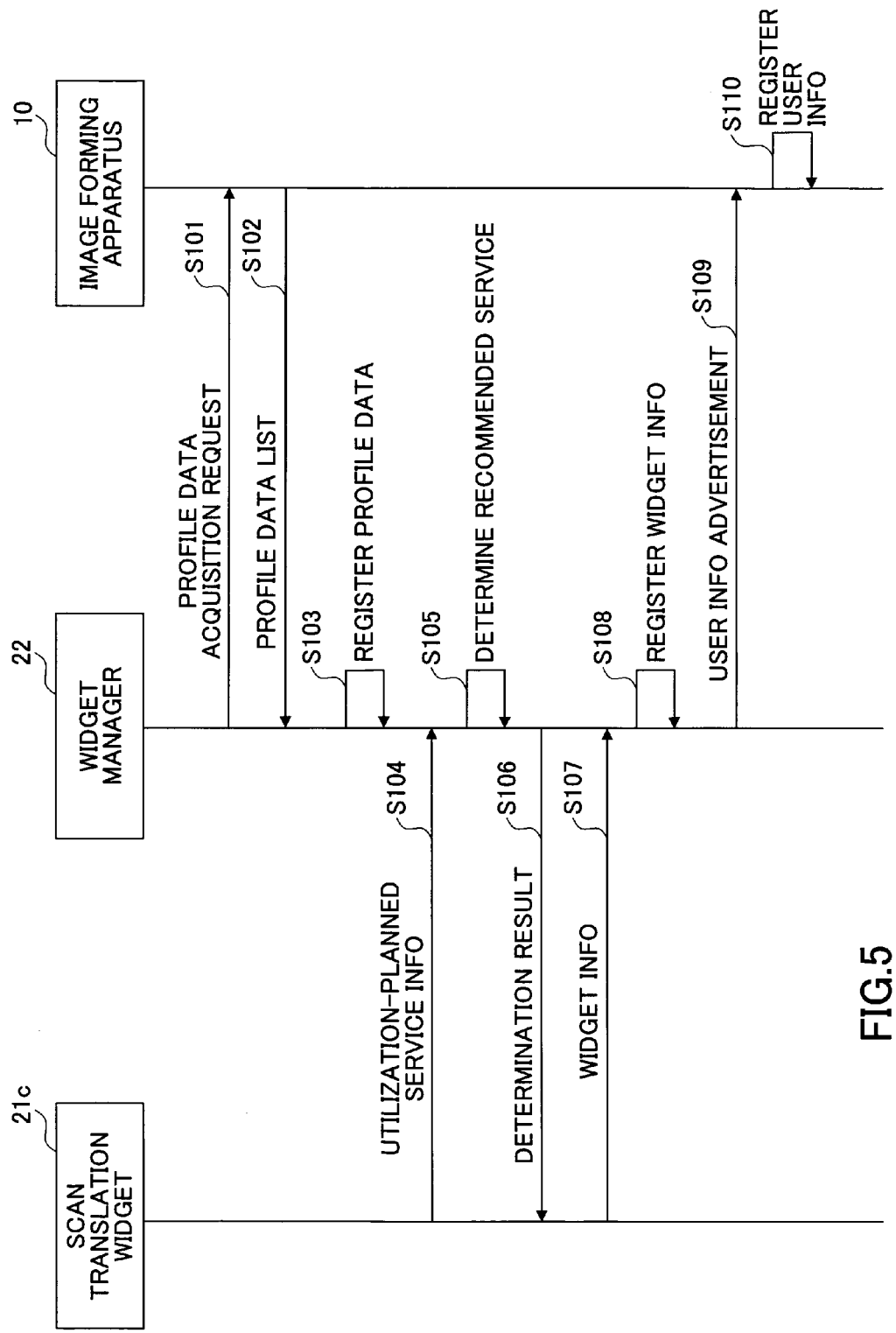
FIG. 5 is a sequence diagram of a process sequence upon starting up of the widget manager and the widget according to the first embodiment.

FIG. 5 is a sequence diagram of a process sequence that is performed upon starting up of the widget manager 22 and the widget 21 in the information processing system 1 according to the first embodiment of the present invention. In order to utilize the widget 21, first the widget manager 22 is started up in the user terminal 20. In response, the profile data acquiring unit 221 searches, by broadcast, for example, for the image forming apparatus 10 with which communication can be established. The profile data acquiring unit 221 then sends a profile data acquisition request to the image forming apparatus 10 (S101). In response to the request, the profile data providing unit 131 of the image forming apparatus 10 acquires the list of profile data from the profile data managing unit 139 and returns the list (S102). Upon reception of the profile data list, the profile data acquiring unit 221 registers the received profile data in the profile data managing unit 228 (S103).

FIG. 6 illustrates an example of the profile data registered in the profile data managing unit 228 of the widget manager 22 in accordance with the first embodiment. In the table of FIG. 6, each line indicates an item of profile data. Although the profile data are represented in the form of a table in FIG. 6, each profile data item may be stored in a file. As depicted in FIG. 6, the profile data include columns for service ID, type identifier, provider name, service category, expiration date, address information, interface information, quality, cost, and delivery (such as a time or date).

The service ID uniquely identifies each service. In accordance with the present embodiment, the service IDs may have various formats as long as they can identify each service uniquely. Thus, address information of a service, which will be described later, may be used as the service ID. The type identifier identifies the type of a service in functional terms. In the example of FIG. 6, the type identifier includes "OCR", "TRANSLATION", and "SCAN". "OCR" indicates a service that provides an OCR function (OCR service). "TRANSLATION" indicates a service providing a translation function (translation service). "SCAN" indicates a service providing a scan function (scan service).

The provider name identifies a service provider. In the example of FIG. 6, the names of applications that provide the various services (service providers) are used as the provider names. Thus, it can be seen that the profile data of FIG. 6 concern services provided by, descending from top to bottom of the table, the OCR software 23, the translation software 24, the OCR service application 31, the translation service application 41, the scan application 1211, the OCR application 1222, and the translation application 1223.

The service category, which is a classification indicating the location of the service provider, includes "local application", "Web service", and "MFP". "Local application" indicates a local application that operates within the same user terminal 20 as the widget 21. "Web service" indicates a Web service available over the Internet. "MFP" indicates the image forming apparatus 10.

The expiration date indicates the date before which the service can be utilized. The expiration date may be registered when a Web service or a local application is used under time-limited license. The address information indicates an address for communication with the service provider. The address information may include an IP address, a URL (Uniform Resource Locator), or a file path name. The interface information indicates an interface for utilizing a service. The interface information may define a method name, an argument name, an argument data type, or a return value type. The interface information may be defined in accordance with any of a number of known technologies.

The "quality", "cost", and "delivery" relate to evaluation information about the contents of a service. Specifically, in the illustrated example of FIG. 6, the quality, cost, and delivery of a service are evaluated on a scale of 10. The quality may have different meanings depending on the type of service. For example, in the case of an OCR service, the quality may indicate a recognition rate. In the case of a scan service, image quality may be considered. In the case of a translation service, translation accuracy may be considered. The "cost" indicates the cost of utilization of a service. For example, in the case of a purchased service, billing does not take place each time the service is utilized. Thus, in this case, the evaluation value may be 10. On the other hand, in the case of a service that is billed each time the service is utilized, the evaluation value may vary depending on the amount billed. The "delivery" is an indicator of service performance in terms of the time between an execution request and the production of a result, or "turnaround time".

In accordance with the present embodiment, the quality, cost, and delivery are utilized as parameters for service comparison purposes. Other appropriate parameters may be used for service comparison purposes, depending on the operation.

In the illustrated example of FIG. 6, the profile data where the service category is "MFP" is the profile data that is registered in step S103. Although the image forming apparatus 10 (MFP) may be configured to provide other services, such as print service, FAX service, and copy service, FIG. 6 only illustrates the profile data of the illustrated services for convenience sake. The profile data where the service category is other than "MFP" are the profile data that have been registered in the user terminal 20 beforehand. The manner of distribution of such profile data is not particularly limited. For example, the profile data may be attached to the service provider (application) and then downloaded; or the profile data may be created by the user. Alternatively, the profile data of a recommended service may be centrally managed by a predetermined server. Regardless of the mode of distribution, the quality, cost, and/or delivery of the profile data may be modified or edited by the user subjectively. In this way, user preferences can be reflected in the selection of a service. This is also true of the profile data where the service category is "MFP".

After the widget manager 22 is started up, the user starts the widget 21 that he or she wishes to utilize. For example, when the scan translation widget 21*c* is started up, the coordinating unit 213 of the scan translation widget 21*c* transmits a list of services that the scan translation widget 21*c* is planned to utilize (utilization-planned service information), to the service recommend unit 222 of the widget manager 22 (S104).

Figure 7:
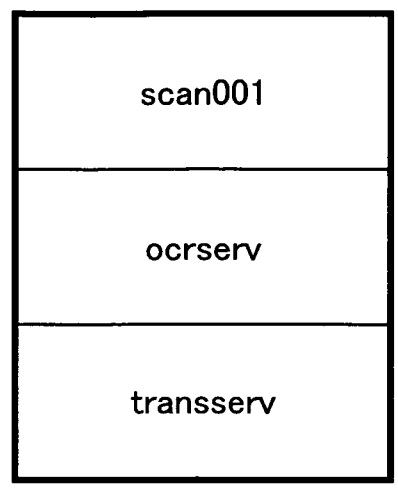
FIG. 7 illustrates an example of utilization-planned service information according to the first embodiment.

FIG. 7 depicts a structure of the utilization-planned service information in accordance with the first embodiment. The structure includes a list of service IDs of the services planned to be utilized, in order of execution (utilization). The service IDs contained in the utilization-planned service information are set as default values of the scan translation widget 21*c*. Specifically, in accordance with the first embodiment, the scan translation widget 21*c* is implemented to utilize the scan service (provided by the scan application 1211) with the service ID "scan001"; the OCR service (provided by the OCR service application 31) with the service ID "ocrserv"; and the translation service (provided by the translation service application 41) with the service ID "transserv", as processes to be utilized by default. The default values of the services to be utilized may be described in the source code of the scan translation widget 21*c*; or they may be described in the attribute information managing file 215. The latter case provides the convenience that a user can modify the default values.

Thereafter, the service recommend unit 222 determines an optimum service (recommended service) from among the services whose type identifiers correspond to those of the services whose service IDs are designated in the utilization-planned service information that has been received (S105). The service recommend unit 222 then returns the result of determination of the recommended service to the coordinating unit 213 of the scan translation widget 21*c* (S106). The details of the recommended service determination process will be described later.

FIG. 8 illustrates an example of the result of the recommended service determination process. The example includes the columns for service ID, type identifier, and provider name, descending in the same order as the type of the utilization-planned service (i.e., in order of execution). The illustrated example of FIG. 8 differs from the utilization planned information of FIG. 7 in the OCR service. This may have been a result of the service recommend unit 222 having determined that the service provided by the OCR application 1222 is more appropriate (i.e., has a higher utilization value) than the service provided by the OCR service application 31.

Thereafter, the widget information transmitting unit 212 of the scan translation widget 21c, based on the result of FIG. 8 and the information registered in the attribute information managing file 215, generates widget information, and transmits the widget information to the widget information registration unit 223 of the widget manager 22 (S107).

FIG. 9 illustrates an example of the widget information of the scan translation widget 21c in accordance with the first embodiment. In this example, the widget information of the scan translation widget 21c includes lines for widget ID, user ID, widget address, display name, and service utilization information. The widget ID is information uniquely identifying each widget 21. The user ID identifies the user of the scan translation widget 21c. Thus, the widget 21 is associated with the user of the user terminal 20 in which the widget 21 is installed. The widget address is information (such as URL) uniquely identifying the widget 21 during a network communication, for example. The display name may include a character string of the name of the widget 21.

The service utilization information includes columns for service ID, type identifier, provider name, and setting information, in which entries are arranged in order of execution of the services that the widget 21 has decided to utilize. The result of determination by the service recommend unit 222 (see FIG. 8) is adopted in the table of FIG. 9 as is. Namely, with regard to the translation service, the translation service by the translation software 24 is adopted as the object of utilization. Whether the result of determination by the service recommend unit 222 is to be adopted is up to the widget 21 (i.e., depends on its implementation). The widget 21 may be implemented so that it always follows the result of the determination, or always rejects it (in the latter case, steps S104 to S106 may not be performed). Alternatively, the widget UI unit 211 may be configured to display the result of determination on the display device 206, so that whether the result of determination should be adopted can be determined by the user. The "setting information" in the service utilization information may include execution conditions associated with the individual services. For example, in the case of the scan service, the setting information may designate a resolution and a color mode. In the case of the OCR service, the setting information may designate a document direction (whether horizontal or vertical) and the type of language. In the case of the translation service, the setting information may designate the language of the translation source and the language of the translated outcome.

The widget ID, the user ID, the widget address, the display name, and the setting information in the service utilization information are acquired from the attribute information managing file 215 of the scan translation widget 21c. Therefore, each user can personalize the widget 21 by editing the attribute information managing file 215.

Thereafter, the widget information registration unit 223 registers the widget information in the widget information managing table 227 corresponding to the user ID contained in the received widget information (S108). If there is no widget information managing table 227 corresponding to the user ID, the widget information registration unit 223 generates the widget information managing table 227 corresponding to the user ID, and registers the widget information in it. In accordance with the present embodiment, the user terminal 20 and the user are associated with each other on a one-to-one basis. Upon turning off of the widget manager 22, the widget information managing table 227 is deleted. Thus, in accordance with the present embodiment, the widget information managing table 227 is generated when the widget 21 is started up for the first time following the startup of the user terminal 20.

When the widget information managing table 227 is newly generated (i.e., when widget information has been registered for the first time for the user associated with the user ID contained in the received widget information), the advertising unit 224 issues an advertisement on the network, the advertisement including the user ID contained in the received widget information, and a URL for acquiring the widget information (S109). The URL uniquely identifies the widget manager 22 (i.e., the user terminal 20).

The advertisement is received by the user detecting unit 132 of the image forming apparatus 10 in a status capable of communicating with the user terminal 20. The user detecting unit 132, in response to the reception of the advertisement, registers the user ID contained in the advertisement and the widget information acquisition URL in the user managing table 138 (S110). FIG. 10 illustrates an example of the user managing table 138. In this example, the user managing table 138 is configured to manage the user ID and the widget information acquisition URL in pairs. In the illustrated example, records for users A and B are registered.

Thus, the presence of the scan translation widget 21c is recognized by the widget manager 22, and the presence of the user of the user terminal 20 is recognized by the image forming apparatus 10. The user can now utilize the scan translation widget 21c via the image forming apparatus 10. If the same user goes on to start up the scan widget 21a or the print widget 21b, the widget information about those widgets are also registered in the widget information managing table 227 of the widget manager 22; however, the advertisement is not issued because an advertisement associated with the user has already been issued.

FIG. 5 illustrates the acquisition of the profile data of the image forming apparatus 10 in response to the startup of the widget manager 22 (S101, S102). These steps, however, may be performed periodically after the startup of the widget manager 22. Alternatively, the steps may be performed in response the input of an instruction from the user.

After the scan translation widget 21c is started up in the user terminal 20, the user may move to the location where the image forming apparatus 10 is installed in order to operate the scan translation widget 21c. When plural image forming apparatuses 10 are in a status capable of communicating with the user terminal 20, the identical advertisement may be received by the user detecting unit 132 of each of the image forming apparatuses 10, and the user ID and the widget information acquisition URL may be registered in the user managing table 138 of each image forming apparatus 10. Thus, the user can operate the widget 21 in the desired one of the plural image forming apparatuses 10.

Figure 11:
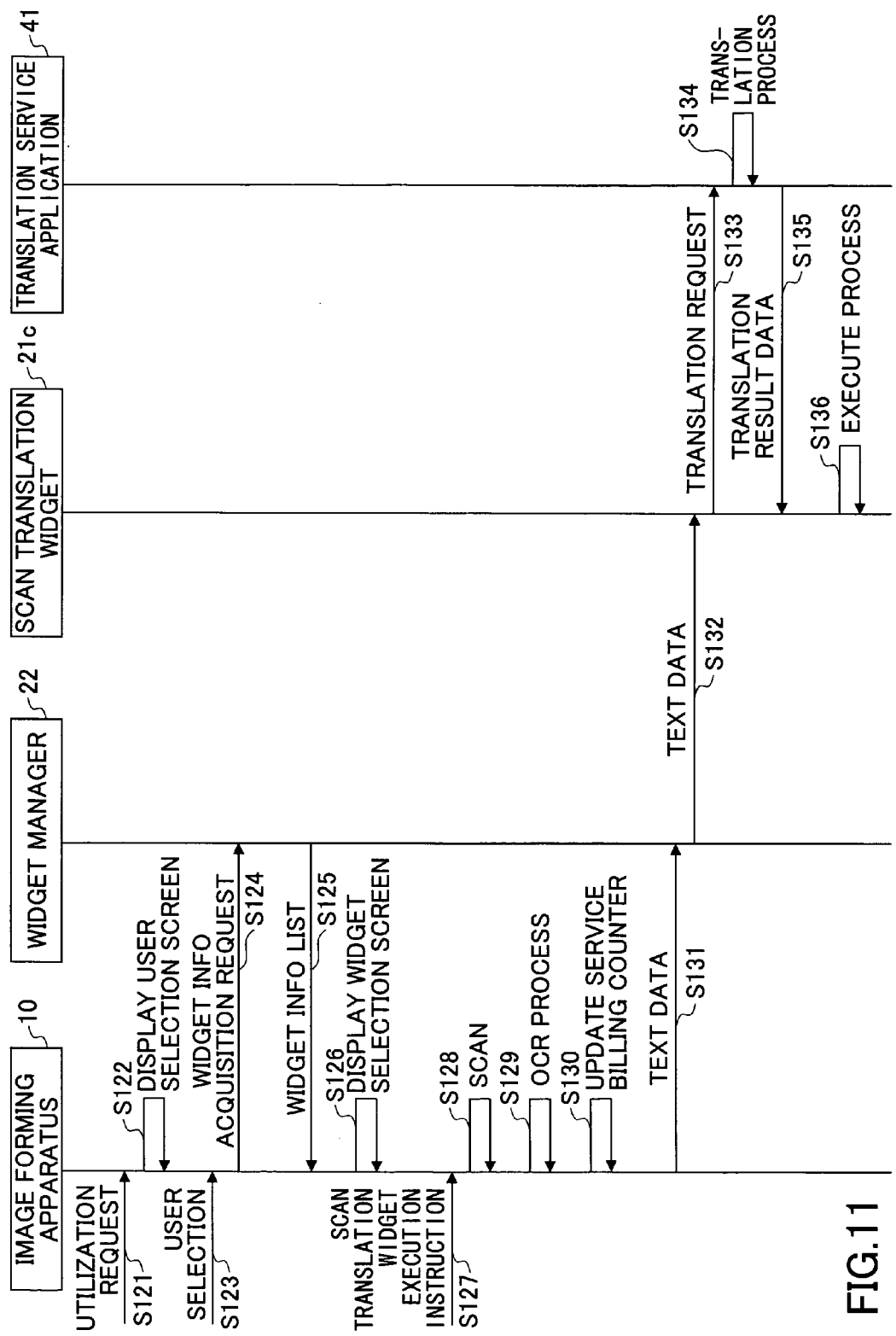
FIG. 11 is a sequence diagram of a process sequence of a scan translation widget according to the first embodiment.
Figure 12:
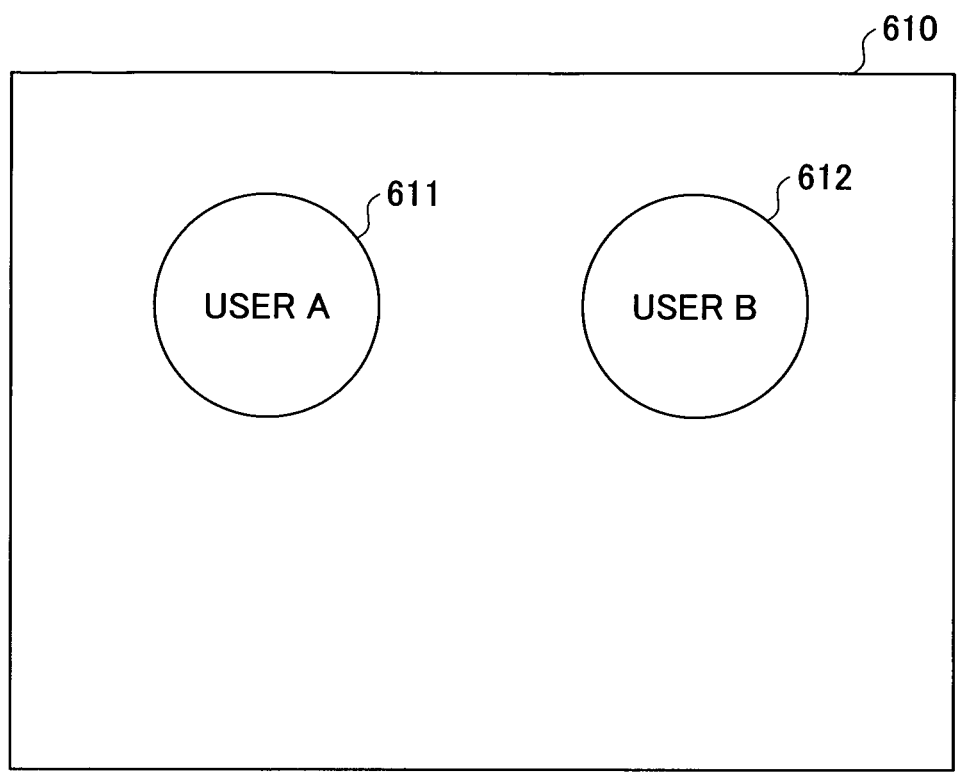
FIG. 12 illustrates an example of a user selection screen.

FIG. 11 is a sequence diagram of a process sequence when the scan translation widget 21c is performed in accordance with the first embodiment. Upon entry of a utilization instruction for the provider application 1221 by a user via the operating panel 15 of the image forming apparatus 10 (S121), the UI control unit 133 of the provider application 1221, based on the information registered in the user managing table 138, causes a user selection screen to be displayed on the operating panel 15 (S122). In step S122, the UI control unit 133 acquires the user information from the widget manager 22 and causes the user selection screen to be displayed based on the acquired user information. In this case, step S109 of FIG. 5 may not necessarily be performed. However, step S109 may be performed by unicast to a particular image forming apparatus 10 (with an IP address registered in the widget manager 22 in advance) having a different subnet from that of the widget manager 22. FIG. 12 illustrates an example of the user selection screen 610. The user selection screen 610 includes a button 611 for user A and a button 612 for user B.

Still referring to FIG. 11, the user depresses the button 611 or 612 associated with his or her user ID on the user selection screen 610 (S123). In response, the widget information acquiring unit 134 acquires the widget information acquisition URL associated with the user ID from the user managing table 138. Alternatively, in response the depressing of the button 611 or 612, user authentication may be performed so that the subsequent processes can be performed only when the user is authenticated.

Thereafter, the widget information acquiring unit 134 transmits a widget information acquisition request to the widget information acquisition URL (S124). The widget information acquisition request addressed to the widget information acquisition URL is then received by the widget information providing unit 225 of the widget manager 22. The widget information providing unit 225 then acquires the widget information of all of the widgets 21 registered in the widget information managing table 227, and transmits a list of the acquired widget information to the provider application 1221 (S125). When transmitting the widget information list, the widget information providing unit 225 generates a unique URL for relaying the communication between the provider application 1221 and each widget 21 (hereafter referred to as a "widget relaying URL") for each widget 21 (i.e., on widget information basis). The widget information providing unit 225 adds the widget relaying URL to the widget information of the corresponding widget 21, and transmits a list of the widget information with the added widget relaying URL to the provider application 1221. The widget information transmitted in step S125 may have a structure depicted in FIG. 13.

Thus, in step S125 of FIG. 11, the widget information list as depicted in FIG. 13, for example, is transmitted. The widget information list may include only one item of widget information. The widget relaying URL may be generated when the widget information is registered in the widget information managing table 227 by the widget information registration unit 223 and then added to the widget information.

Figure 14:
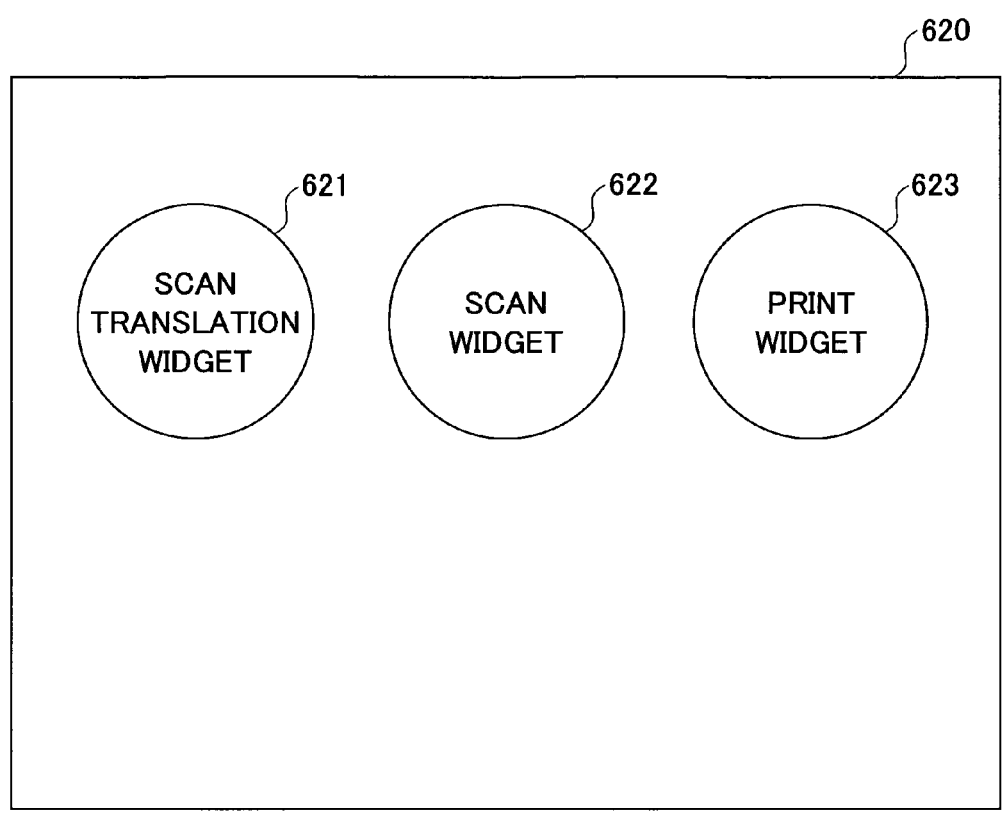
FIG. 14 illustrates an example of a widget selection screen.

Then, the UI control unit 133 of the provider application 1221 records the received widget information list in the RAM 112, and causes, based on the widget information list, a display of a widget selection screen 620 showing a list of the widgets 21 that the user can utilize (S126). FIG. 14 illustrates an example of the widget selection screen 620, showing a button 621 for the scan translation widget 21c, a button 622 for the scan widget 21a, and a button 623 for the print widget 21b.

Still referring to FIG. 11, after the button 621 corresponding to the scan translation widget 21c is selected in the widget selection screen 620 and a manuscript is set on the scanner 12, a start key on the operating panel 15 is depressed (S127). Then, the service control unit 136 of the provider application 1221, based on the type identifier "SCAN" and the provider name "scan application 1211" contained in the first entry (see FIG. 13) of the service utilization information contained in the widget information corresponding to the depressed button (hereafter referred to as "current widget information"), recognizes that the scan application 1211 should perform the scan service. Thus, the service control unit 136 designates the setting information contained in the first entry, and inputs a scan execution instruction into the scan application 1211. The scan application 1211 then causes the scanner 12 to scan the manuscript. Resultant image data (scanned image) is outputted to the service control unit 136 (S128).

Thereafter, the service control unit 136, based on the type identifier "OCR" and the provider name "OCR application" contained in the second entry of the service utilization information (FIG. 13), recognizes that the OCR application 1222 should execute the OCR service. Thus, the service control unit 136 designates the setting information contained in the second entry, and inputs an OCR process execution instruction concerning the scanned image into the OCR application 1222. The OCR application 1222 then executes the OCR process on the scanned image, and outputs resultant text data to the service control unit 136 (S129).

Thereafter, the service control unit 136, based on the fact that the provider name "translation service application" contained in the third entry of the service utilization information (FIG. 13) is not the provider name of any of the services within the image forming apparatus 10, determines that the execution of all of the services requested of the provider application 1221 has been completed, and then sends a request to the service billing unit 137 to perform a billing process regarding the services executed. The request designates a list of the service IDs of the services executed. The service billing unit 137, in accordance with the request, updates the service billing counter 140 (S130). Specifically, the billing counters for the service IDs are counted up. Whether the provider name of the service corresponds to the provider name of a service within the image forming apparatus 10 may be determined based on whether a program module corresponding to the provider name exists within the image forming apparatus 10. Alternatively, the determination may be based on whether profile data corresponding to the service ID of the relevant service is registered in the profile data managing unit 139 of the image forming apparatus 10.

Upon completion of the billing process, the service control unit 136 inputs the text data and the service ID of the service that has been performed last (i.e., "ocr002" in the illustrated example, which may be referred to as "final service ID") into the widget coordinating unit 135. Thereafter, the widget coordinating unit 135 transmits the text data and the final service ID to the widget relaying URL contained in the current widget information (S131). The text data and the final service ID addressed to the widget relaying URL are then received by the relaying unit 226 of the widget manager 22. The relaying unit 226 then acquires the widget information corresponding to the widget relaying URL from the widget information managing table 227, and transfers the text data and the final service ID to the widget address contained in the widget information (S132).

The text data and the final service ID addressed to the widget address are received by the coordinating unit 213 of the scan translation widget 21c. The coordinating unit 213 inputs the text data and the final service ID into the logic unit 214 of the scan translation widget 21c. The logic unit 214, recognizing that the OCR service has been executed in view of the final service ID, transmits a translation process execution request to the translation service application 41 based on the service utilization information (see FIG. 9)(S133). The translation process execution request includes the text data. The translation process execution request may be based on the interface information contained in the profile data of the translation service application 41. The interface information may be acquired from the profile data managing unit 228 via the widget manager 22 based on the service ID of the translation service application 41.

Thereafter, the translation service application 41 executes the translation process on the text data (S134), and returns resultant text data (translation result data) to the logic unit 214 of the scan translation widget 21c (S135). Upon reception of the translation result data, the logic unit 214 executes a predetermined process (logic) on the translation result data (S136). For example, the logic unit 214 stores the text data in a location set in the attribute information managing file 215.

The image forming apparatus 10 does not concern itself with the billing for the utilization of the translation service application 41 because the contract for utilization of the translation service application 41 is an issue between the user and the provider of the translation service using the translation service application 41. Thus, in the image forming apparatus 10, the service billing counter 140 is not updated with regard to the translation service.

However, the widget manager 22 may record a history of utilization of the translation service application 41 in a storage unit of a predetermined computer. In this case, the scan translation widget 21c may notify the widget manager 22 that it has utilized the translation service application 41, in a step after step S135 (by, for example, sending the service ID of the translation service application 41). Such notice (service utilization notice) enables the widget manager 22 to detect the utilization of the translation service application 41 and record the utilization history. Alternatively, the widget coordinating unit 135 may, at a predetermined timing (such as in step S131), transmit the widget information of the scan translation widget 21 (see FIG. 9) to the widget manager 22. In this case, the widget manager 22 can detect utilization of the translation service application 41 with reference to the service utilization information contained in the widget information as a service utilization notice, and record the utilization history. The widget manager 22 may determine that the translation service application 41 is a service not provided by the image forming apparatus 10 with reference to the service category of the profile data (see FIG. 6) registered in the profile data managing unit 228.

The widget manager 22 may notify the provider of the widget manager 22 (which may be a seller of the image forming apparatus 10) about the utilization history periodically. In this case, no individual-identifying information is required. The provider of the widget manager 22 may calculate a total number of times of utilization by all users based on the gathered utilization history, and perform a simplified billing process (for an introduction fee for having recommended the utilization of the translation service application 41) on the provider of the translation service application 41 depending on the calculated total. In this way, the user only needs to pay attention to the utilization contract for the translation service application 41. The periodical notice is facilitated by the absence of the need for acquiring the personal information about the individual users.

During the execution of the process of FIG. 11, the process of FIG. 5 may be executed in parallel. Specifically, based on a widget information registration request from the widget 21 owned by the user terminal 20 of a user different from the user who is currently operating the image forming apparatus 10, user IDs or the like contained in the widget information may be registered in the user managing table 138 of the image forming apparatus 10.

Figure 15:
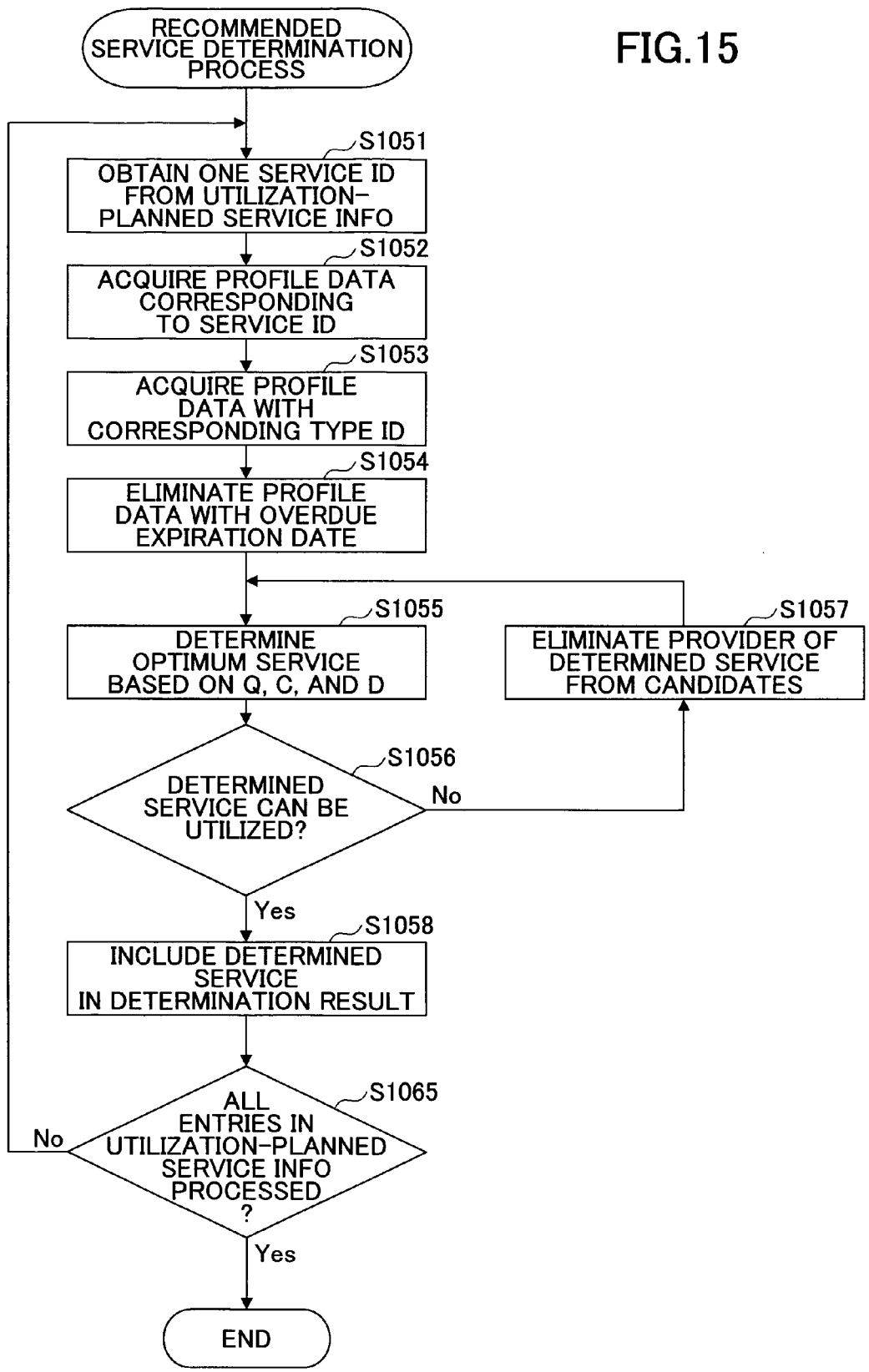
FIG. 15 is a flowchart of a recommended service determination process according to the first embodiment.

With reference to FIG. 15, step S105 of FIG. 5 is described in greater detail. FIG. 15 is a flowchart of a process sequence of determining a recommended service according to the first embodiment. In step S1051, the service recommend unit 222 acquires a service ID contained in the utilization-planned service information (see FIG. 7). For example, "scan001" is acquired. The service recommend unit 222 then acquires the profile data corresponding to the service ID from the profile data managing unit 228, and records it in the profile data list (S1052). The service recommend unit 222 then acquires from the profile data managing unit 228 all of the profile data whose type identifiers correspond to the type identifier of the acquired profile data, and adds the acquired profile data in the profile data list (S1053). For example, all profile data with the type identifier "SCAN" are recorded in the profile list.

Thereafter, the service recommend unit 222 removes profile data with overdue expiration dates from the profile data list (S1054). The service recommend unit 222, based on the evaluation value of each item of the profile data in the profile data list in terms of quality (Q), cost (C), and delivery (D), calculates an overall evaluation value (S) of each service, and determines an optimum service based on the overall evaluation value (S) (S1055). Namely, a service having the highest overall evaluation value (S) is selected as an optimum service.

In accordance with the present embodiment, the overall evaluation value (S) is calculated by the following evaluation formula:

$$S = \alpha \times Q + \beta \times C + \gamma \times D$$

where $\alpha$, $\beta$, and $\gamma$ are weighting coefficients for quality, cost, and delivery, respectively. The value of each coefficient may be set on a widget by widget basis. For example, the UI control unit of the widget 21 causes the display of a setting screen after the startup of the widget 21 and before the transmission of utilization-planned service information. The coordinating unit 213 then transmits the values of the coefficients entered via the setting screen to the service recommend unit 222, together with the utilization-planned service information. The service recommend unit 222, using the values of the received coefficients as well as the utilization planned information, then calculates the overall evaluation value (S). In this way, the priority order of a service as an object of utilization can be changed depending on the situation. Similarly, the evaluation formula may be set by the user as in the case of the coefficients. When there is more than one service with the highest evaluation value, a service contained in the utilization-planned service information may be preferentially selected.

Thereafter, the service recommend unit 222 determines whether the service that has been determined to be optimum can be utilized (S1056). For example, when the service category of the selected service is "MFP", it may be determined that the service can be utilized if the profile data associated with the service have been acquired. When the service category of the selected service is "Web service", utility of the service may be determined depending on whether communications with the corresponding service provider (OCR service application 31 or the translation service application 41, for example) can be made. The determination of communicability may involve the transmission of a ping command based on the address information. When the service category of the selected service is "local application", utility of the service may be determined based on whether the corresponding service provider (the OCR software 23 or the translation software 24, for example) is or can be started up.

If it is determined that the service cannot be utilized ("No" in S1056), the service recommend unit 222 eliminates the service from the profile data list (S1057), and repeats steps S1055 and S1056. If it is determined that the service can be utilized ("Yes" in S1056), the service recommend unit 222 includes the service ID, the type identifier, and the provider name of the service in the result of determination (S1058).

Upon completion of the process in steps S1051 through S1058 for all of the services (service IDs) contained in the utilization-planned service information ("Yes" in S1065), the process of FIG. 15 ends. Alternatively, utility of a service contained in the utilization-planned service information may be initially determined, and another optimum service may be selected only when the service cannot be utilized.

Thus, in accordance with the first embodiment, an appropriate service can be automatically determined by the service recommend unit 222 based on the profile data of each service. Therefore, the widget 21 can realize and provide its own function by utilizing the appropriate service.

In the image forming apparatus 10, billing is managed for each of the services that the image forming apparatus 10 can provide via the network. Thus, the billed amount may vary depending on the number of services utilized. Furthermore, the amount billed for utilization from the image forming apparatus 10 can be distributed on a service by service basis easily and clearly (This feature is clearer in the fourth embodiment). Therefore, the potential for creating a new business model utilizing the image forming apparatus 10 can be increased.

The types (type identifiers) of the services in the image forming apparatus 10 are determined by the manufacturer or the seller of the image forming apparatus 10. Basically, the types of services that can be provided by the standard application 121 or the SDK application 122 of the image forming apparatus 10 are the types of services available from the image forming apparatus 10. This means that, from the viewpoint of a service provider other than the manufacturer or seller of the image forming apparatus 10, the types of a service in the image forming apparatus 10 are fixed. Thus, when providing an alternative service to the services in the image forming apparatus 10, the provider of the alternative service is bound by the types of services defined in the image forming apparatus 10. Specifically, the alternative services needs to be classified in accordance with the types defined in the image forming apparatus 10.

However, this does not mean that the service provider other than the manufacturer or seller of the image forming apparatus 10 cannot define an arbitrary service type. A new service can be utilized by the widget 21 when the type of the new service is defined, the profile data about the service that belongs to the type is defined, and the widget 21 that utilizes the service belonging to the type is implemented. Namely, the widget manager 22 handles the types of the services defined in the image forming apparatus 10 and the types of services defined outside the image forming apparatus 10 equally. Specifically, when determining an optimum service, the service recommend unit 222 does not concern itself with whether the type of the service is defined in the image forming apparatus 10. Such a structure ensures service extensibility.

In the foregoing example, the widget manager 22 is implemented within the same user terminal 20 as the widget 21. The widget manager 22, however, may be implemented in a computer separately from the user terminal 20. For example, a process corresponding to the widgets 21 in plural user terminals 20 may be centrally executed by a single widget manager 21.

Embodiment 2

Figure 16:
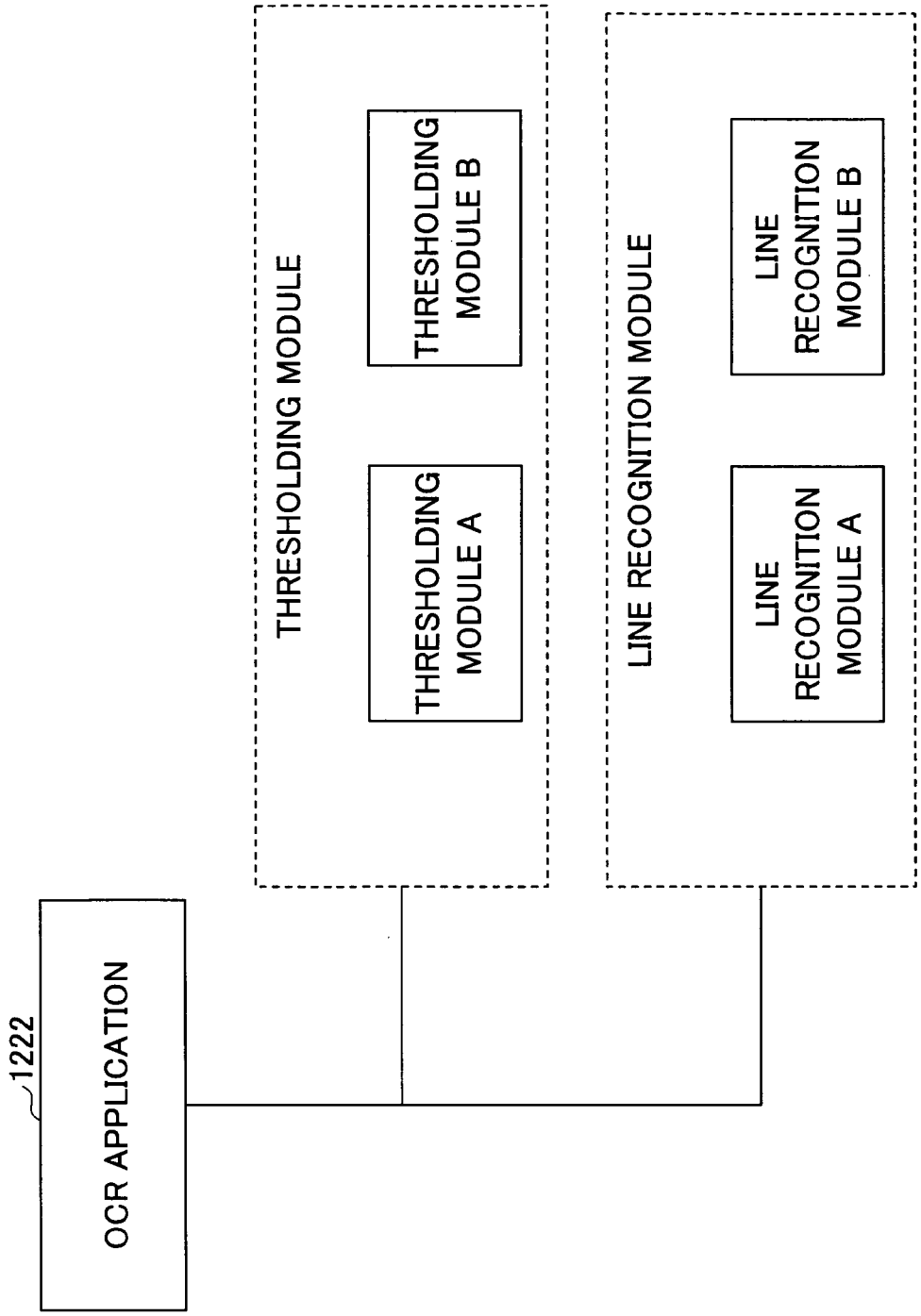
FIG. 16 illustrates a relationship between an OCR application an lower-level modules according to the second embodiment of the present invention.

Hereafter, a second embodiment is described, in which an OCR application 1222 in the image forming apparatus 10 realizes a part of the function of the OCR process by utilizing a lower-level program module (program component). FIG. 16 is a block diagram of an OCR application 1222 and lower-level modules according to the second embodiment. In an OCR process, the OCR application 1222 utilizes a thresholding module for a thresholding process (for eliminating the appearance of unwanted background texture and the like in scanned text data) and a line recognition module for a line recognition process. In the image forming apparatus 10, the thresholding module may include, as real entities, a thresholding module A installed as a standard and a thresholding module B installed later as a plugin or the like. The line recognition module may include, as real entities, a line recognition module A implemented as a standard and a line recognition module B installed later as a plugin or the like. The OCR application 1222 may be implemented so that the thresholding module A is utilized for the thresholding process and the line recognition module A is utilized for the line recognition process by default.

In the following, a process sequence of the information processing system 1 according to the second embodiment is described. In the second embodiment, the process sequence upon startup of the widget manager 22 and the widget 21 is substantially similar to the process sequence in the first embodiment (see FIG. 5). However, in the second embodiment, in step S103, profile data depicted in FIG. 17 may be registered in the profile data managing unit 228.

FIG. 17 illustrates an example of the profile data registered in the profile data managing unit of the widget manager according to the second embodiment. In the second embodiment, an item (column) for lower-level service is added. In the lower-level service column, service IDs of replaceable services provided by the lower-level modules are registered. Thus, information about related lower-level services can be obtained. In the illustrated example, "ocr002.thresholdA" and "ocr002.lineA" are registered for the OCR application 1222. "ocr002.thresholdA" is the service ID of the service (thresholding service) provided by the thresholding module A. "ocr002.lineA" is the service ID of the service (line recognition service) provided by the line recognition module A. In the service IDs of the lower-level services, the service ID of a higher-level service is added as a prefix to help in understanding the relationship between the higher-level service and the lower-level service during execution of a program.

In the illustrated example, the profile data of the thresholding module A, the line recognition module A, the thresholding module B, and the line recognition module B are also registered. Specifically, profile data having the service IDs of "ocr002.thresholdA", "ocr002.lineA", "ocr002.thresholdB", and "ocr002.lineB" are registered. Thus, for services provided by the replaceable lower-level modules (in a second layer and below), profile data similar in structure to that of the first layer services are defined and registered in the profile data managing unit 228. Therefore, the evaluation values in terms of quality, cost, and delivery are also registered for services provided by the lower-level modules.

Thus, in accordance with the second embodiment, each service provided by the lower-level modules is also handled as a unit of service in the image forming apparatus 10.

As described with reference to the first embodiment, the profile data in FIG. 17 having the service category of "MFP" are the profile data that have been registered in the profile data managing unit 139 and then acquired from the provider application 1221 and registered in step S103.

Figure 18:
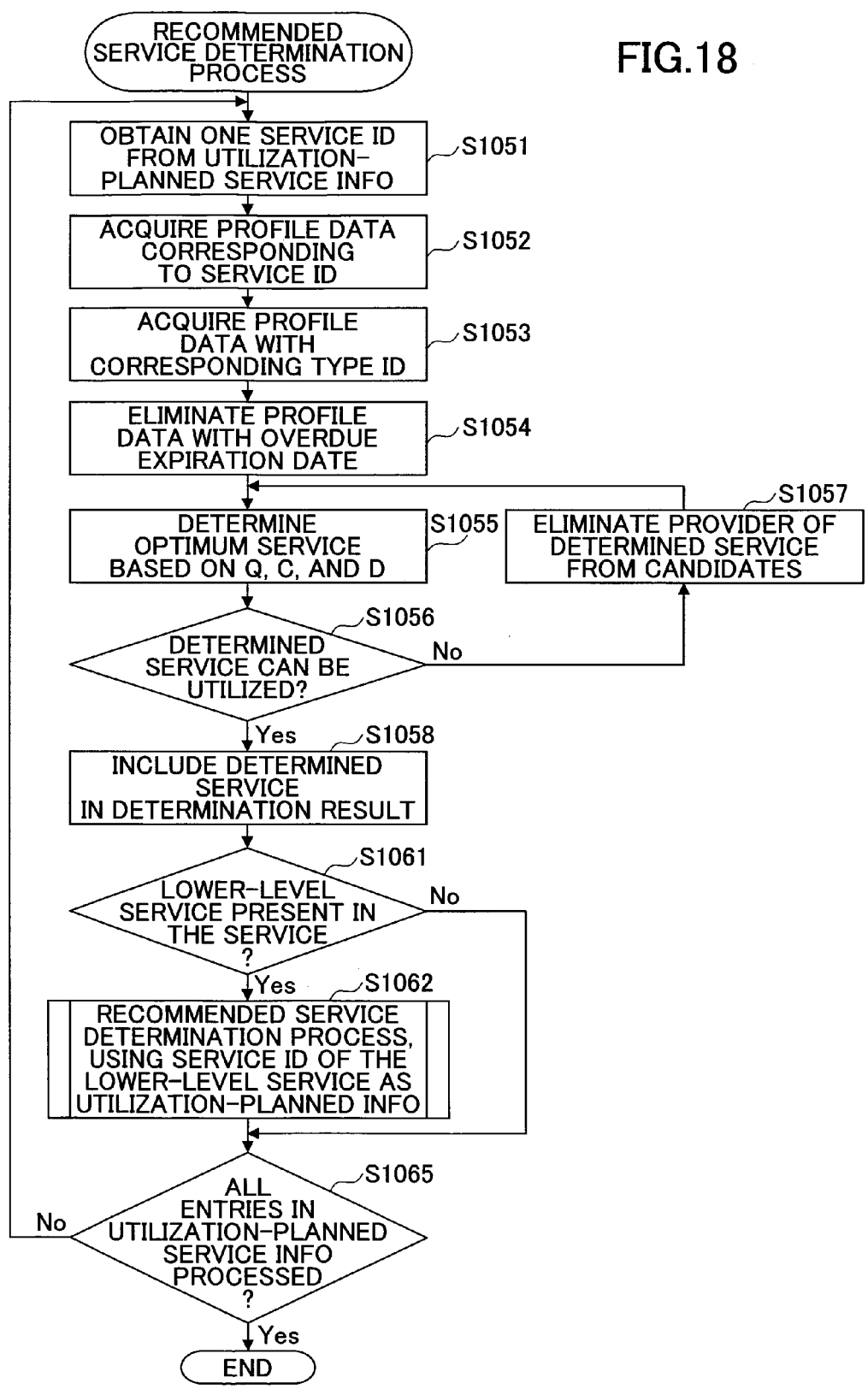
FIG. 18 is a flowchart of a recommended service determination process according to the second embodiment.

In accordance with the second embodiment, the recommended service determination process performed by the service recommend unit 222 varies depending on the structure of the profile data. FIG. 18 is a flowchart of a process sequence for determining a recommended service in the second embodiment. In FIG. 18, steps similar to the corresponding steps in FIG. 15 are designated with similar step numbers and their description is omitted. In the flowchart of FIG. 18, steps S1061 and S1062 are added. In step S1061, the service recommend unit 222 determines whether a service ID of a lower-level service is registered in the profile data of the service that has been determined to be optimum (i.e., whether the lower-level service can be replaced). If the service ID of the lower-level service is registered ("Yes" in S1061), the service recommend unit 222 recursively performs the recommended service determination process (i.e., the process of FIG. 18) using the service ID of the lower-level service as utilization-planned service information (S1062).

For example, with reference to the profile data shown in FIG. 17, if it is determined with regard to the OCR service that the service with the service ID "ocr002" is optimum, the service IDs of its lower-level services ("ocr.thresholdA" and "ocr002.lineA") are registered in the profile data of the service. Thus, the service recommend unit 222 recursively performs the process in step S1051 and the subsequent steps using those two service IDs as utilization-planned service information. Then, a result of determination depicted in FIG. 19, for example, is returned from the service recommend unit 222 to the coordinating unit 213 of the scan translation widget 21c.

FIG. 19 illustrates an example of the result of determination of the recommended service in the second embodiment. As shown, the result includes the columns for service ID, type identifier, and provider name of a lower-level service. In the illustrated example, non-default services (i.e., services by the thresholding module B and the line recognition module B) are selected for both the thresholding service and the line recognition service. When a default service is selected for a lower-level service, the service ID of the service may not be included in the result of determination.

When the result of determination depicted in FIG. 19 is adopted by the scan translation widget 21c, widget information depicted in FIG. 20, for example, is transmitted to the widget information registration unit 223 in steps S107 and S108 of FIG. 5 and then registered in the widget information managing table 227. FIG. 20 illustrates an example of the widget information of the scan translation widget according to the second embodiment. The service utilization information in the widget information includes information about a thresholding service and a line recognition service. Thus, in the second embodiment, information about a lower-level service may be included in the service utilization information of the widget information.

Hereafter, a process sequence of the scan translation widget 21c according to the second embodiment is described. The process sequence is substantially similar to that of the first embodiment (FIG. 11). However, in step S129, the service control unit 136, based on the type identifier "OCR" and the provider name "OCR application" contained in the second entry of the service utilization information in FIG. 20, recognizes that the OCR application 1222 is to execute the OCR service. Further, based on the fact that the third entry and the fourth entry of the service utilization information include service IDs with a prefix of the service ID ("ocr002") of the OCR service by the OCR application 1222, the service control unit 136 recognizes that an OCR service utilizing the lower-level modules (lower-level services) corresponding to those entries should be executed.

Thus, the service control unit 136 designates the setting information contained in the second entry and the contents of the third entry and the fourth entry, and enters an execution instruction for an OCR process on scanned image into the OCR application 1222. The OCR application 1222 then executes the OCR process on the scanned image, and outputs resultant text data to the service control unit 136. In this case, the OCR application 1222 utilizes the thresholding module B for the thresholding process and the line recognition module B for the line recognition process.

Thereafter, the service control unit 136 designates the list of service IDs of the executed services, and requests the service billing unit 137 to execute a billing process. The service ID list includes the service IDs ("ocr.thresholdB" and "ocr002.lineB") of the lower-level services. Therefore, the service billing unit 137 updates the service billing counter 140 also for the lower-level services on a service by service basis (S130). Namely, because the lower-level services are handled as individual service units, a billing counter exists for each lower-level service.

While the foregoing example has a two-layer module structure, the module structure according to the second embodiment may have three or more layers, as is self-evident from the structure example of the profile data in FIG. 17 or the process sequence of FIG. 18. For example, when there is a lower-level module for the line recognition module A, the service ID of the service by the lower-level module may be registered in the lower-level service column of the profile data of the line recognition module A, and the profile data of the service of the lower-level module may be defined.

A replaceable range of the lower-level modules (in the second layer and below) may be limited to the common service category. This is because it may be difficult to determine the structure of a service in its entire layers in advance, and it may be more convenient to determine the replaceable range within the common service category. Further, this can prevent an increase in communications between service categories when a lower-level module is replaced.

Thus, in accordance with the second embodiment, when the service has a layered structure, not only the highest-level service but also an appropriate lower-level service can be automatically determined and utilized. Therefore, increased flexibility can be achieved in the manner of utilization of a service depending on the situation. Further, in accordance with the second embodiment, the billing counter is updated for each lower-level service. Thus, the billing process can be managed in a flexible manner.

Embodiment 3

Hereafter, a third embodiment of the patient information is described. In the third embodiment, a more specific situation is considered in the information processing system 1 depicted in FIG. 1. Specifically, the image forming apparatus 10 is installed in a convenience store. A user of the user terminal 20 visits the convenience store to utilize the image forming apparatus 10. The user terminal 20 may therefore include a portable terminal. The user terminal 20 and the image forming apparatus 10 can communicate with each other via wireless communication. The wireless communication range of the convenience store may be limited so that customers connecting via a wireless LAN cannot connect to networks outside the store. Alternatively, the user terminal 20 may communicate with the image forming apparatus 10 via a local connection established by a short-range wireless communication technology, such as Bluetooth.

In such a situation setting, the user starts up the widget manager 22 in the user terminal 20 and further starts up the scan translation widget 21c, whereby the process of FIG. 5 is executed. In steps S101 and S102, the profile data of the image forming apparatus 10 installed in the convenience store is acquired. The image forming apparatus 10 charges for various services it provides. Therefore, the evaluation value of the cost of the profile data of each service may be lowered in accordance with the billed amount.

Referring to FIG. 5, in step S104, the coordinating unit 213 of the scan translation widget 21c transmits the utilization-planned service information depicted in FIG. 7 to the service recommend unit 222 of the widget manager 22. Then, the widget manager 22 executes the recommended service determination process (S105). Because the convenience store does not allow communications with the outside, the OCR service application 31 and the translation service application 41 are eliminated from the objects of utilization in step S1056 of the determination process (FIG. 15) as being incapable of communication. The result of determination by the service recommend unit 222 may be as depicted in FIG. 21.

FIG. 21 illustrates an example of the result of determination of a recommended service according to the third embodiment. In the third embodiment, as opposed to the first or the second embodiment, the translation service by the translation software 24 is recommended. The translation service application 41 is not recommended because a network communication with it is disabled, as mentioned above. The translation application 1223 of the image forming apparatus 10 is not recommended presumably because of its low evaluation value in terms of cost.

Figure 22:
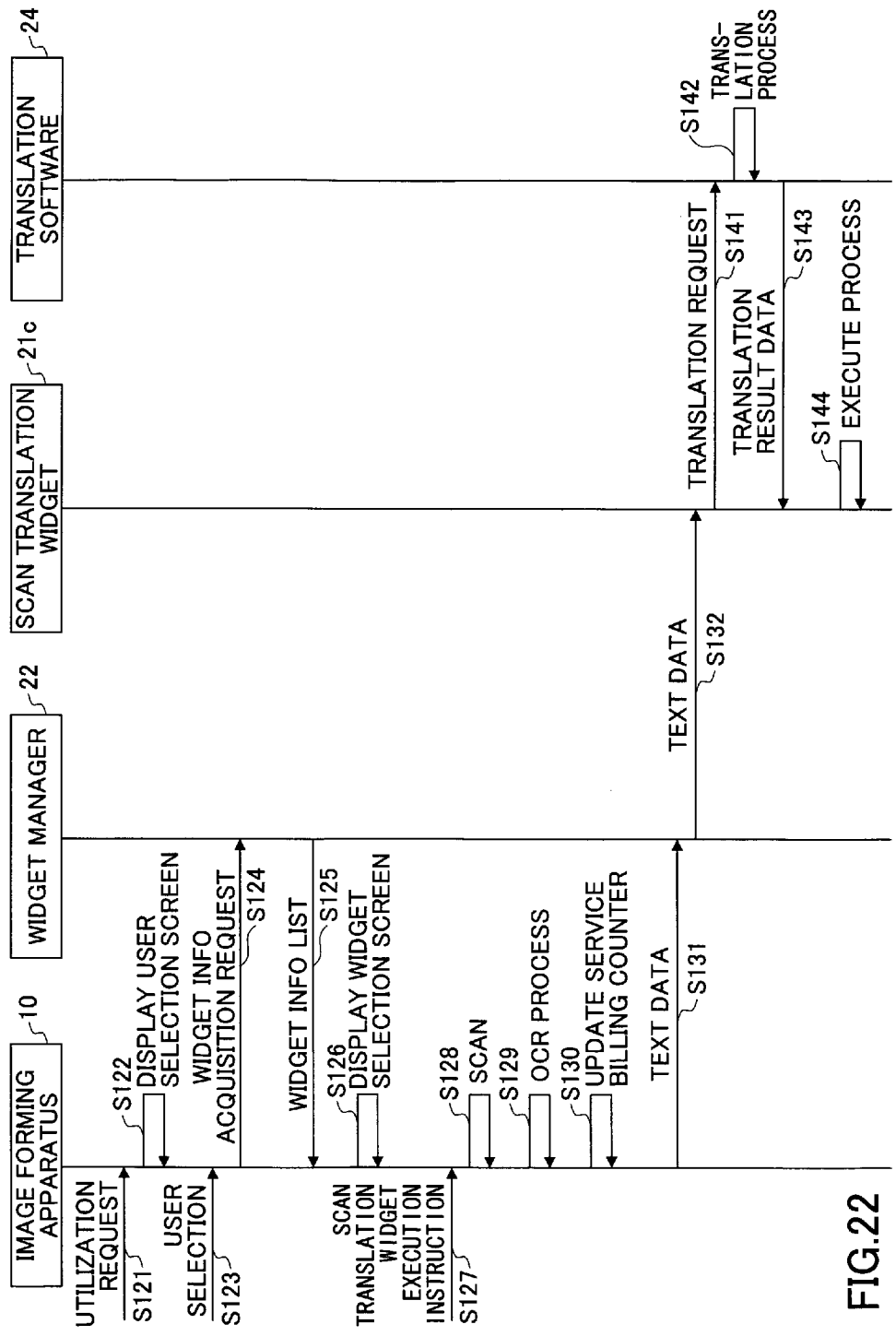
FIG. 22 is a sequence diagram of a process sequence of a scan translation widget according to the third embodiment.

A process sequence of the scan translation widget 21c when the result of determination depicted in FIG. 21 is adopted is described with reference to a sequence diagram of FIG. 22. In FIG. 22, steps similar to the corresponding steps depicted in FIG. 11 are designated with similar step numbers and their description is omitted.

In step S125, with regard to the scan translation widget 21c, widget information depicted in FIG. 23, for example, is transmitted to the widget information acquiring unit 134 of the provider application 1221 and registered in the profile data managing unit 139. FIG. 23 illustrates an example of the structure of the widget information of the scan translation widget 21c transmitted from the widget manager 22 to the provider application 1221. In the service utilization information of the illustrated widget information, the translation service by the translation software 24 is considered an object of utilization.

Because of the widget information depicted in FIG. 23, the process in step S141 and in subsequent steps is different from that of FIG. 11. Specifically, upon reception of the text data and the final service ID by the coordinating unit 213 of the scan translation widget 21c (S132), the text data and the final service ID are entered into the logic unit 214 of the scan translation widget 21c. The logic unit 214, based on the final service ID, recognizes that the process up to the OCR service has been performed, and transmits a translation process execution request to the translation software 24 based on the service utilization information (see FIG. 23) (S141). The translation process execution request includes the text data. The translation process execution request is made based on interface information contained in the profile data of the translation software 24.

Thereafter, the translation software 24 performs a translation process on the text data (S142), and returns translation result data obtained as a result of the translation process to the logic unit 214 of the scan translation widget 21c (S143). Upon reception of the translation result data, the logic unit 214 performs a predetermined process (logic) on the translation result data as an object of processing (S144). For example, the logic unit 214 stores the text data in a location set by the attribute information managing file 215. In the process of FIG. 22, the image processing apparatus 10 is utilized for the scan service and the OCR service. Therefore, the user (customer) is billed for an amount for the utilization of the scan service and the OCR service, based on the service billing counter 140. Thus, in accordance with the third embodiment, the user can utilize the image forming apparatus 10 installed outside his or her office or house, for example, without changing the widgets that he or she normally uses.

Embodiment 4

In accordance with a fourth embodiment of the present invention, another specific situation is considered in connection with the information processing system 1 (see FIG. 1). Specifically, the image forming apparatus 10 is installed in a shop of a company that provides a print service (the "service" herein is intended to refer to a business service that is broader in meaning than the services provided by the computer system according to the present embodiment).

The translation server 40 is a server operated by the company. The translation application 1223 in the image forming apparatus 10 does not implement a translation process in itself; rather, the translation application 1223 is implemented such that the translation process can be delegated to the translation service application 41 of the translation server 40. The translation server 40 is hidden from the user terminal 20. Namely, a user of the user terminal 20 does not recognize the presence of the translation service by the translation service application 41. The user of the user terminal 20 may be a customer who visits the shop to utilize the image forming apparatus 10. Thus, the user terminal 20 may include a portable terminal. The user terminal 20 and the image forming apparatus 10 may communicate with each other via a wireless communication technology, such as a wireless LAN or Bluetooth.

In this situation, the user starts up the widget manager 22 in the user terminal 20 and further starts up the scan translation widget 21c. In response, the process of FIG. 5 is performed. In steps S101 and S102, the profile data of the image forming apparatus 10 installed in the shop is acquired. In step S103, the profile data registered in the widget information managing table 227 may be as depicted in FIG. 24, which illustrates an example of the profile data registered in the profile data managing unit of the widget manager 22 according to the fourth embodiment. The profile data of FIG. 24 differs greatly from that of the first embodiment (see FIG. 6) in that no profile data concerning the service by the translation service application 41 (with the service ID "transserv") is included. This is because, as mentioned above, the translation server 40 is hidden from the user terminal 20 and the user of the user terminal 20 does not recognize the presence of the translation service by the translation service application 41.

In the fourth embodiment, the services provided by the image forming apparatus 10 are charged. Thus, the evaluation values of cost of the services in the profile data may be lowered depending on the billed amount. In FIG. 24, the evaluation values of the translation application 1223 in terms of quality, cost, and delivery are substantially equal to the evaluation values of the translation service application 41 in the translation server 40 in terms of quality, cost, and delivery.

Thereafter, in step S104, the coordinating unit 213 of the scan translation widget 21c transmits the utilization-planned service information depicted in FIG. 7 to the service recommend unit 222 of the widget manager 22. In response, the widget manager 22 executes the recommended service determination process (S105). The result of determination by the service recommend unit 222 may be as depicted in FIG. 25. FIG. 25 illustrates an example of the result of determination of the recommended service according to the fourth embodiment. As depicted, in the fourth embodiment, the OCR service by the OCR software 23 and the translation service by the translation application 1223 are recommended. The OCR software 23 may have been recommended because of its evaluation value in cost. The translation application 1223 may have been recommended because of its evaluation value in quality.

Figure 26:
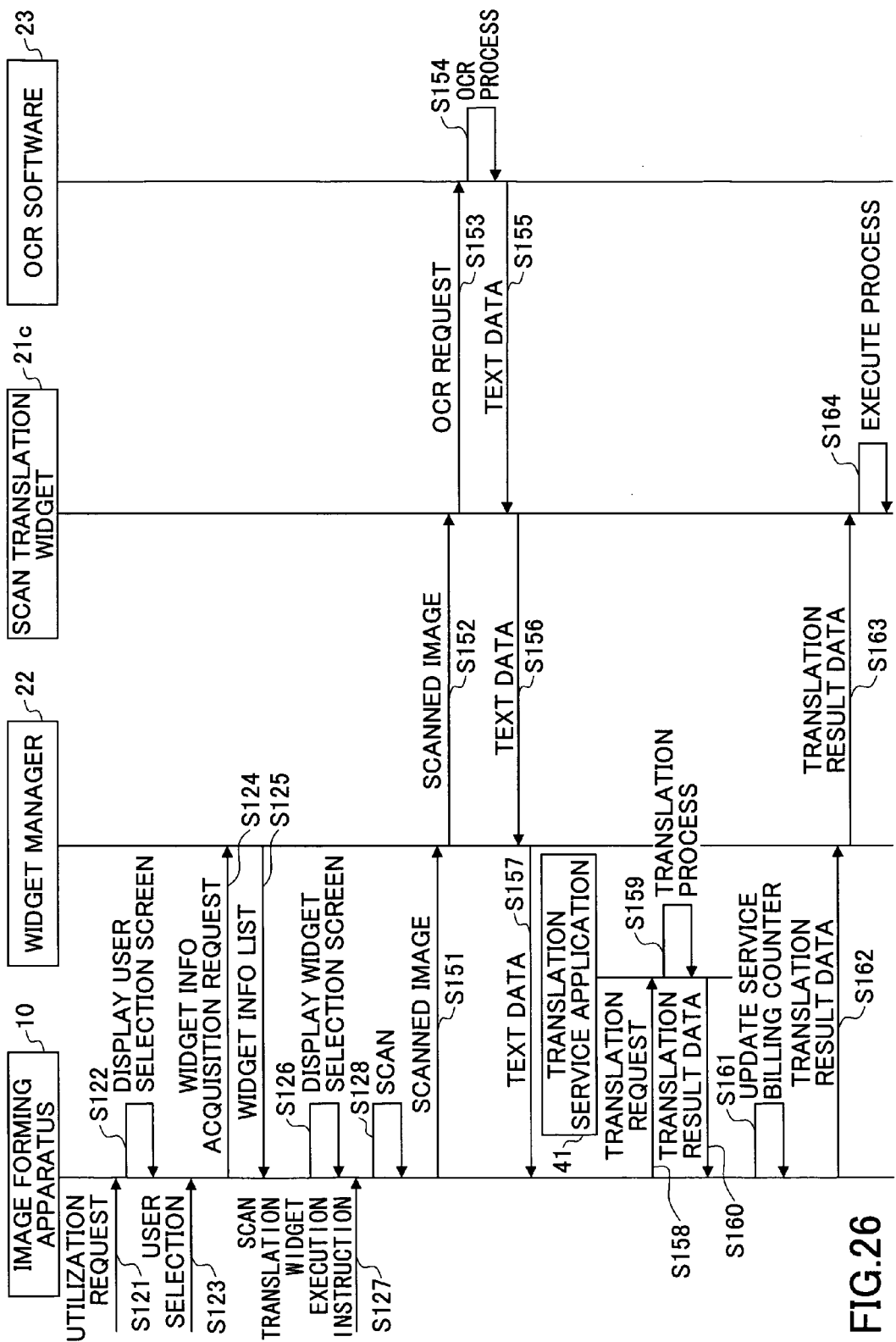
FIG. 26 is a sequence diagram of a process sequence of a scan translation widget according to the fourth embodiment.

With reference to a sequence diagram in FIG. 26, a process sequence of the scan translation widget 21c when the result of determination depicted in FIG. 25 has been adopted is described. In FIG. 26, steps corresponding to the similar steps of FIG. 11 are designated with similar step numbers and their description is omitted. In step S125, with regard to the scan translation widget 21c, widget information as depicted in FIG. 27, for example, is transmitted to the widget information acquiring unit 134 of the provider application 1221 and registered in the profile data managing unit 139. FIG. 27 illustrates an example of the structure of the widget information of the scan translation widget 21c transmitted from the widget manager 22 to the provider application according to the fourth embodiment. In the service utilization information of the widget information, the result of determination depicted in FIG. 25 is adopted as is.

The widget information (current widget information) of FIG. 27 makes the process in step S151 and in subsequent steps different from the process of FIG. 11. Namely, after a scan is performed, the service control unit 136 recognizes the need to output the result of the service (scanned image) executed up to now although not all of the services requested of the provider application 1221 have been executed. The service control unit 136 recognizes such need in light of the fact that the provider name "OCR" included in the second entry of the service utilization information in the widget information of FIG. 27 does not correspond to any service provider name in the image forming apparatus 10; and that the provider name "translation application" included in the third entry corresponds to a service provider name in the image forming apparatus 10. Thus, the service control unit 136 inputs the scanned image, the final service ID ("scan001" in the illustrated example), and information indicating that one of the services requested of the provider application 1221 is yet to be executed, to the widget coordinating unit 135. The service control unit 136 records the service ID of the next service (translation service) that is requested of the provider application 1221 in the RAM 112.

Thereafter, the widget coordinating unit 135 transmits the scanned image and the final service ID to the widget relaying URL contained in the current widget information (S151). Then, the widget coordinating unit 135, based on the information indicating the remaining service requested of the provider application 1221, stands by for a request from the widget manager 22. The scanned image and the final service ID addressed to the widget relaying URL are received by the relaying unit 226 of the widget manager 22. The relaying unit 226 acquires the widget information corresponding to the widget relaying URL from the widget information managing table 227, and transfers the scanned image and the final service ID to the widget address included in the widget information. The scanned image and the final service ID addressed to the widget address are then received by the coordinating unit 213 of the scan translation widget 21c. The coordinating unit 213 inputs the scanned image and the final service ID into the logic unit 214 of the scan translation widget 21c. The logic unit 214, based on the final service ID, recognizes that the process up to the execution of the scan service has been performed, and transmits an OCR process execution request to the OCR software 23 based on the service utilization information (see FIG. 27) (S153). The OCR process execution request includes the scanned image. The OCR process execution request is made based on interface information contained in the profile data of the OCR software 23.

The OCR software 23 executes the OCR process on the scanned image (S154), and returns text data obtained as a result of the OCR process to the logic unit 214 of the scan translation widget 21c (S155). Then, the logic unit 214 inputs the text data into the coordinating unit 213. The coordinating unit 213 transfers the text data to the relaying unit 226 of the widget manager 22 (S156). The relaying unit 226 then transmits the received text data to the widget coordinating unit 135 of the provider application 1221 (S157). Upon reception of the text data, the widget coordinating unit 135, which has been waiting for a request from the widget manager 22, inputs the text data into the service control unit 136.

The service control unit 136, based on the service ID recorded in the RAM 112 of the service that is to be executed next, inputs the text data into the translation application 1223, and requests execution of the translation process. Thereafter, the translation application 1223 transmits the text data to the translation service application 41, and requests execution of the translation process (S158). The translation service application 41 executes the translation process on the text data (S159), and returns translation result data to the translation application 1223 (S160). The translation application 1223 outputs the received translation result data to the service control unit 136.

Then, the service control unit 136, seeing that there is no fourth entry in the service utilization information (see FIG. 27), determines that all of the services for which requests have been sent to the provider application 1221 have been executed, and sends a billing process request to the service billing unit 137 for the services executed. The request designates a list of the service IDs of the executed services. In response to the request, the service billing unit 137 updates the service billing counter 140 (S161). Specifically, the billing counter for each service ID ("scan001" and "trans003") is counted up. In accordance with the fourth embodiment, the translation service is a service provided by the company or the shop in which the image forming apparatus 10 is installed. Therefore, based on the billing counter for the translation service, the revenue to be allocated to the company or the shop can be easily determined.

Upon completion of the billing process, the service control unit 136 inputs the translation result data and the final service ID ("trans003") into the widget coordinating unit 135. Then, the widget coordinating unit 135 transmits the translation result data and the final service ID to the widget relaying URL contained in the current widget information (S162). The translation result data and the final service ID addressed to the widget relaying URL are received by the relaying unit 226 of the widget manager 22. The relaying unit 226 acquires the widget information corresponding to the widget relaying URL from the widget information managing table 227, and transfers the translation result data and the final service ID to the widget address contained in the widget information (S163).

The text data and the final service ID addressed to the widget address are received by the coordinating unit 213 of the scan translation widget 21c. The coordinating unit 213 inputs the translation result data and the final service ID to the logic unit 214 of the scan translation widget 21c. The logic unit 214, based on the final service ID, recognizes that the execution of all of the services contained in the utilization information have been completed (i.e., that the input data is translation result data), and executes a predetermined process (logic) using the translation result data as a processed object (S164).

In the foregoing example, the billing process is executed after completion of the execution of all of the services for which a request has been sent to the provider application 1221. Alternatively, the service billing counter 140 may be updated each time the execution of a service is completed. For example, when the result of execution of one of the services (scanned image) is transferred from the image forming apparatus 10 to the user terminal 20, as in the fourth embodiment, the user may be regarded as having at least partly enjoyed the requested services. Therefore, it may not be considered improper to charge for the service that has been delivered if some abnormality (such as a communication failure) develops and the scan translation widget 21c could not yield a final product (translation result data), as long as the scanned image is in the hands of the user.

Thus, in accordance with the fourth embodiment, the service (such as the translation service in the illustrated example) provided by the company or its shop is coordinated with the image forming apparatus 10, so that the amount billed to the user of the image forming apparatus 10 can be allocated to the company or the shop. This means that a new revenue source is ensured for the company or the shop. Thus, an increased incentive is created for the company and the shop to install the image forming apparatus 10 according to the present embodiment. As a result, the seller of the image forming apparatus 10 can also benefit.

However, in accordance with the fourth embodiment because the optimum service is automatically determined or selected by the service recommend unit 222 of the widget manager 22, the service provided by the company or the shop may not be necessarily selected as the object of utilization. Indeed, the user may fail to realize that such service is being provided by the company or the shop. In the following fifth embodiment, the chances of utilization of the service provided by the company or the shop are increased.

Embodiment 5

Figure 28:
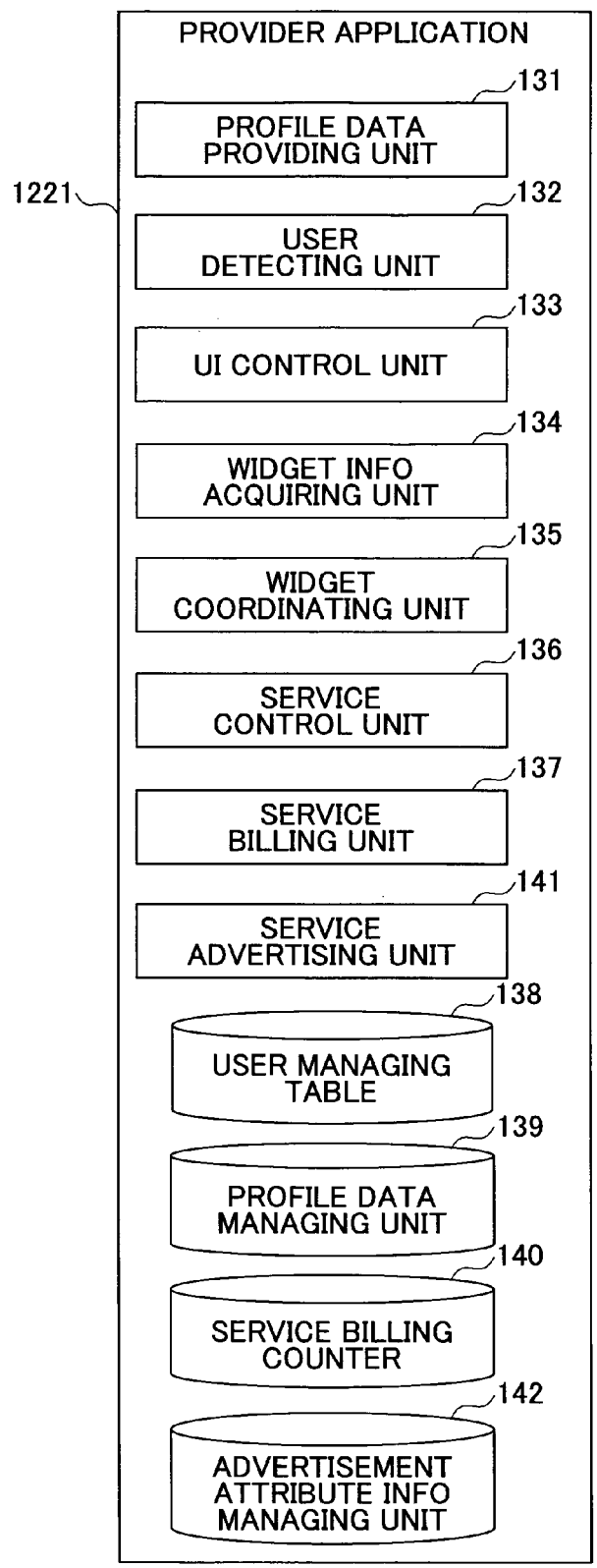
FIG. 28 is a block diagram of a functional structure of a provider application according to a fifth embodiment of the present invention.

FIG. 28 is a block diagram of a functional structure of the provider application 1221 according to the fifth embodiment. In FIG. 28, units or components similar to those of the provider application 1221 of FIG. 2 are designated with similar reference numerals and their description is omitted. The provider application 1221 depicted in FIG. 28 additionally includes a service advertising unit 141 and an advertisement attribute information managing unit 142. The service advertising unit 141 controls a process of advertising a service to users. The advertisement attribute information managing unit 142 provides a storage area in the HDD 114 in which advertisement attribute information is recorded. The advertisement attribute information includes information for advertising services.

In accordance with the fifth embodiment, it is assumed that the result of determination by the service recommend unit 222 did not include the translation service by the translation application 1223 (which is substantially the translation service by the translation service application 41), and the result of determination has been adopted as is. Namely, it is assumed that in the service utilization information in the widget information of the scan translation widget 21c registered in the profile data managing unit 139 of the provider application 1221 (see FIG. 27, for example), the translation service by the translation software 24 is the selected object of utilization. In the following, a process sequence of the scan translation widget 21c in the above assumption is described.

Figure 29:
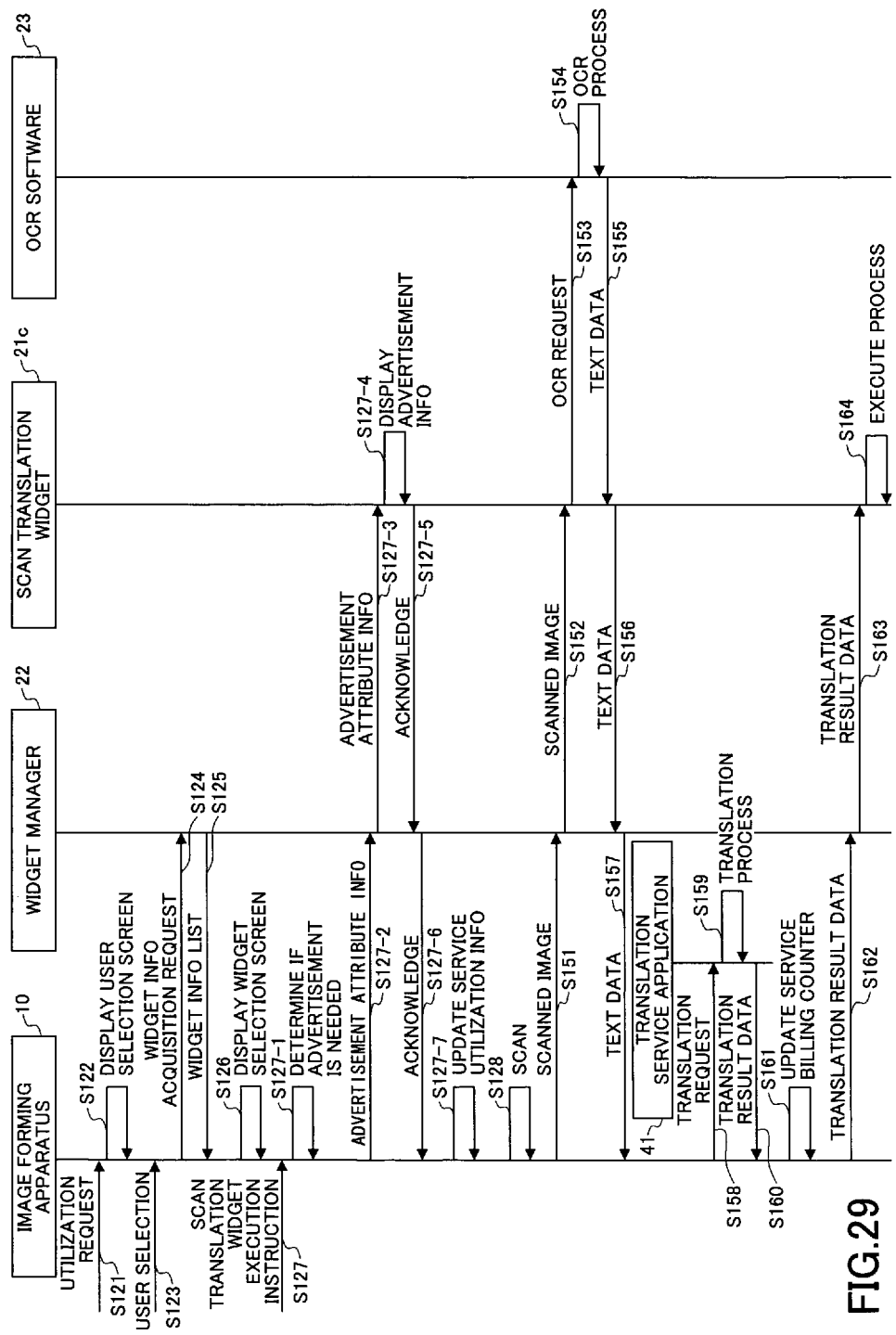
FIG. 29 is a sequence diagram of a process sequence of a scan translation widget according to the fifth embodiment.

FIG. 29 is a sequence diagram of the process sequence of the scan translation widget 21c according to the fifth embodiment. In FIG. 29, steps similar to the corresponding steps of FIG. 26 are designated with similar step numbers and their description is omitted. In the process sequence of FIG. 29, steps S127-1 through S127-7 are added. Specifically, in the widget selection screen 620 (FIG. 14), the button 621 corresponding to the scan translation widget 21c is selected, a manuscript is set on the scanner 12, and then a start key on the operating panel 15 (FIG. 3) is depressed (S127). Then, the service advertising unit 141 determines whether it is necessary to advertise a service whose advertisement attribute information is registered in the advertisement attribute information managing unit 142 (S127-1).

FIG. 30 illustrates an example of the structure of the advertisement attribute information in the advertisement attribute information managing unit 142. The advertisement attribute information includes the columns for service ID, type identifier, and advertising information. The service ID identifies a service to be advertised ("object of advertisement"). The type identifier identifies the type of the service to be advertised. In accordance with the present embodiment, the translation service by the translation application 1223 (i.e., translation service by the translation service application 41) is the object of advertisement. The advertising information includes data for displaying a so-called "advertising copy". For example, the advertising information includes a message saying that the translation service is being offered by the translation service application 41, or extolling the merits of utilizing the translation service application 41. Data format of the advertising information is not particularly limited; it may consist of a sequence of letters, image data, and/or document data.

The service advertising unit 141, with reference to the services (such as the scan, OCR, and translation services) as objects of utilization in the service utilization information in the widget information (current widget information) of the scan translation widget 21c (see FIG. 27, for example), searches the advertisement attribute information managing unit 142 for a record whose service ID may differ but that has a corresponding type identifier (i.e., a record of a service that is the object of advertisement but not the object of utilization). If the advertisement attribute information of any of the services that are the objects of utilization in the current widget information is retrieved, the service advertising unit 141 determines that the service needs advertisement, and transmits the advertisement attribute information to the widget relaying URL contained in the current widget information (S127-2).

The advertisement attribute information addressed to the widget relaying URL is received by the relaying unit 226 of the widget manager 22. The relaying unit 226 acquires the widget information corresponding to the widget relaying URL from the widget information managing table 227, and transfers the advertisement attribute information to the widget address contained in the widget information (S127-3). The advertisement attribute information transmitted to the widget address is received by the coordinating unit 213 of the scan translation widget 21c. The coordinating unit 213 then inputs the advertisement attribute information into the widget UI unit 211. The widget UI unit 211 causes the display device 206 to display an advertising screen showing the advertising information contained in the advertisement attribute information and a button (such as a check button) for selecting whether the advertised service should be utilized (S127-4). In accordance with the fifth embodiment, the advertising information about the translation service application 41 is displayed on the advertising screen.

When there are plural services to be advertised ("objects of advertisement"), the advertising information and the button may be displayed for each service. In the advertising screen, when the user selects one or more of the services, the coordinating unit 213 acquires a list of the service IDs of the selected services from the advertisement attribute information, and transmits the service ID list to the relaying unit 226 of the widget manager 22 (S127-5). The coordinating unit 213 updates the service utilization information in the widget information retained in the scan translation widget 21c with the service ID. If, on the other hand, the user selects not to utilize any of the services advertised in the advertising screen, the coordinating unit 213 transmits an empty service ID list to the relaying unit 226.

Thereafter, the relaying unit 226 transmits the service ID list to the service advertising unit 141 of the provider application 1221 (S127-6). The service advertising unit 141, unless the received service ID list is empty, updates the service utilization information in the current widget information with the service IDs included in the list (S127-7). Thus, the services as the objects of utilization can be exchanged.

In the fifth embodiment, when the translation application 1223 is selected as the object of utilization in response to the advertisement for the translation service application 41, the process sequence in step S128 and in subsequent steps is the same as described with reference to FIG. 26. Therefore, with regard to the translation service, the translation service application 41 is utilized via the translation application 1223.

The advertising information may be displayed on the image forming apparatus 10. In this case, the advertisement attribute information may not be transferred to the widget 21 (scan translation widget 21c). Specifically, the service advertising unit 141 inputs the advertisement attribute information retrieved from the advertisement attribute information managing unit 142 into the UI control unit. The UI control unit causes an advertising screen to be displayed on the operating panel 15 for displaying the advertising information contained in the advertisement attribute information. When a utilization instruction for a service advertised via the advertising screen is entered by the user, a notice indicating that the service as an object of utilization is being replaced is transmitted to the scan translation widget 21c via the widget coordinating unit 135 and the relaying unit 226 of the widget manager 22. Such a notice may include the service ID of the service that has newly become an object of utilization and its type identifier. The coordinating unit 213, based on the service ID and the type identifier, then updates the service utilization information in the widget information retained in the scan translation widget 21c.

Thus, in accordance with the fifth embodiment, a service (such as the translation service) that is provided by the company or the shop and that is coordinated with the image forming apparatus 10 can be actively advertised to customers. Thus, an increased incentive can be provided for the company or the shop to install the image forming apparatus 10 according to the present embodiment. As a result, the revenue for the seller of the image forming apparatus 10 can be also increased.

In accordance with the fourth and the fifth embodiments, in the process sequence of "scan→OCR→translation", scan and translation are performed by the image forming apparatus 10. As a result, the number of times of communications between the image forming apparatus 10 and the scan translation widget 21c is increased. Such an increase in the number of times of communications may affect the entire process time of the scan translation widget 21c. The number of times of such communications may be reduced by way of the recommended service determination process in the service recommend unit 222. For example, in the case of the fifth embodiment, the service recommend unit 222 may be configured to determine that the OCR service by the OCR application 1222 is the optimum OCR service. In more general terms, for a service that is sandwiched between services with the service category "MFP" in the order of execution of the services, a corresponding service with the service category "MFP" may be preferentially selected. Alternatively, in the same order of the services, for the "MFP" service located before or after the "non-MFP" service, a corresponding "non-MFP" service may be preferentially selected.

Embodiment 6

Figure 31:
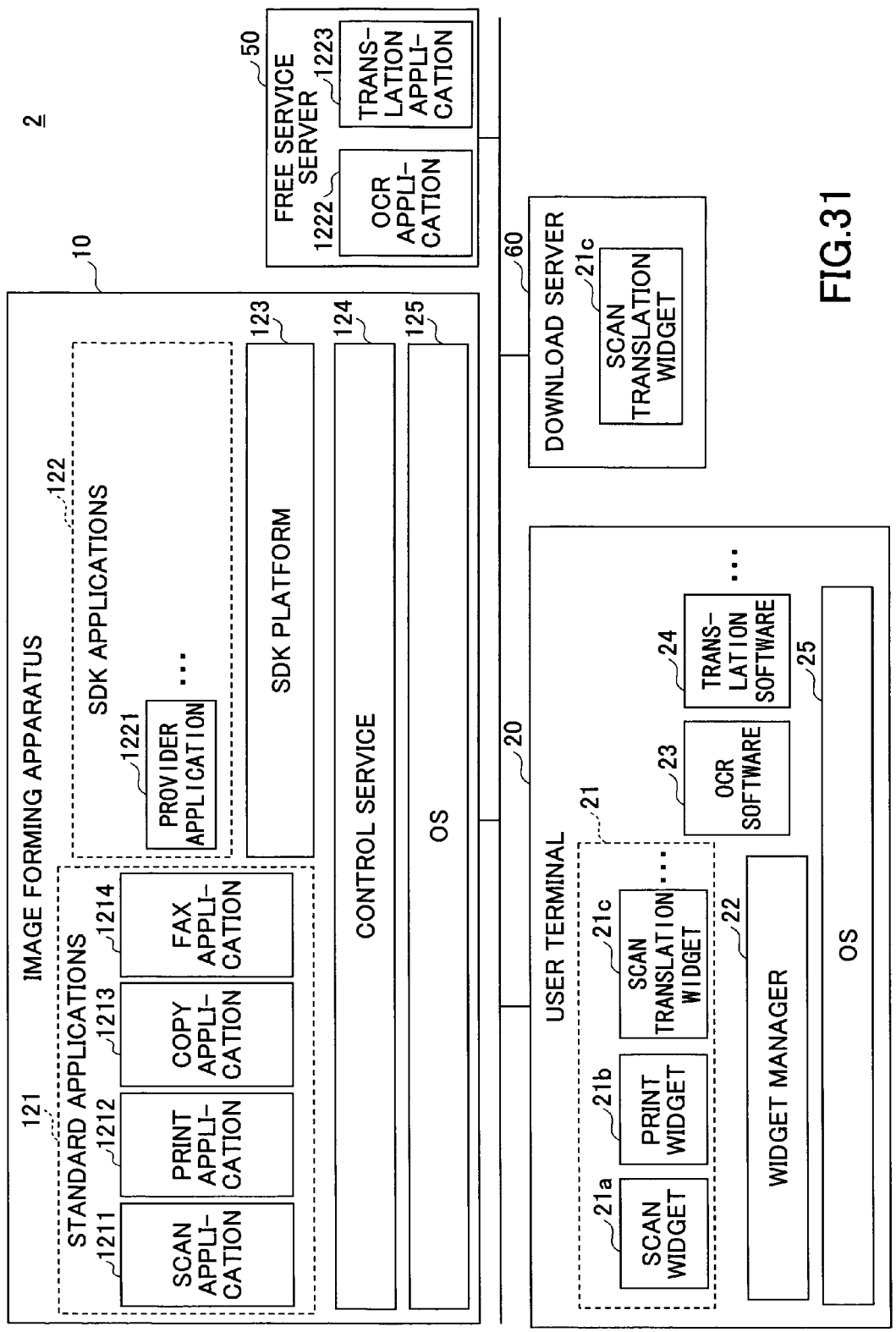
FIG. 31 is a block diagram of an information processing system according to a sixth embodiment of the present invention.

FIG. 31 is a block diagram of an example of the structure of an information processing system 2 according to the sixth embodiment. In FIG. 31, units similar to those of FIG. 1 are designated with similar reference numerals and their description is omitted. The information processing apparatus 2 includes a free service server 50 and a download server 60. The free service server 50 and the download server 60 may be computer servers managed by a seller or a manufacturer of the image forming apparatus 10. The free service server 50 (either as a Web service or an ASP (Application Service Provider), for example) provides a service by the SDK application 122 of the image forming apparatus 10 via a network, for free. In accordance with the present embodiment, the services by the OCR application 1222 and the translation application 1223 (see FIG. 1) may be provided for free.

The download server 60 provides a download service for the various widgets 21 developed by the seller or manufacturer of the image forming apparatus 10. The scan translation widget 21c of the user terminal 20 may be downloaded from the download server 60. The image forming apparatus 10 may be installed in an office (workplace) of a company. A user of the terminal 20 may be an employee of the company.

With reference to FIG. 31, the image forming apparatus 10 is not installed with the OCR application 1222 or the translation application 1223. This may be because the SDK application 122 is for a fee, and the administrator of the image forming apparatus 10 in the office may not have recognized the need for the OCR application 1222 or the translation application 1223 for a fee.

On the other hand, the seller of the image forming apparatus 10 also sells the SDK application 122, and operates on a business model for ensuring a revenue by the sales of the SDK application 122. For example, the seller is paid a monthly fee by a user who installed the SDK application 122 on the image forming apparatus 10 for the use of the SDK application 122. Thus, sales and promotion of the SDK application 122 is a very important issue for the seller. In accordance with the sixth embodiment, sales of the SDK application 122 is promoted in the system of FIG. 31.

Figure 32:
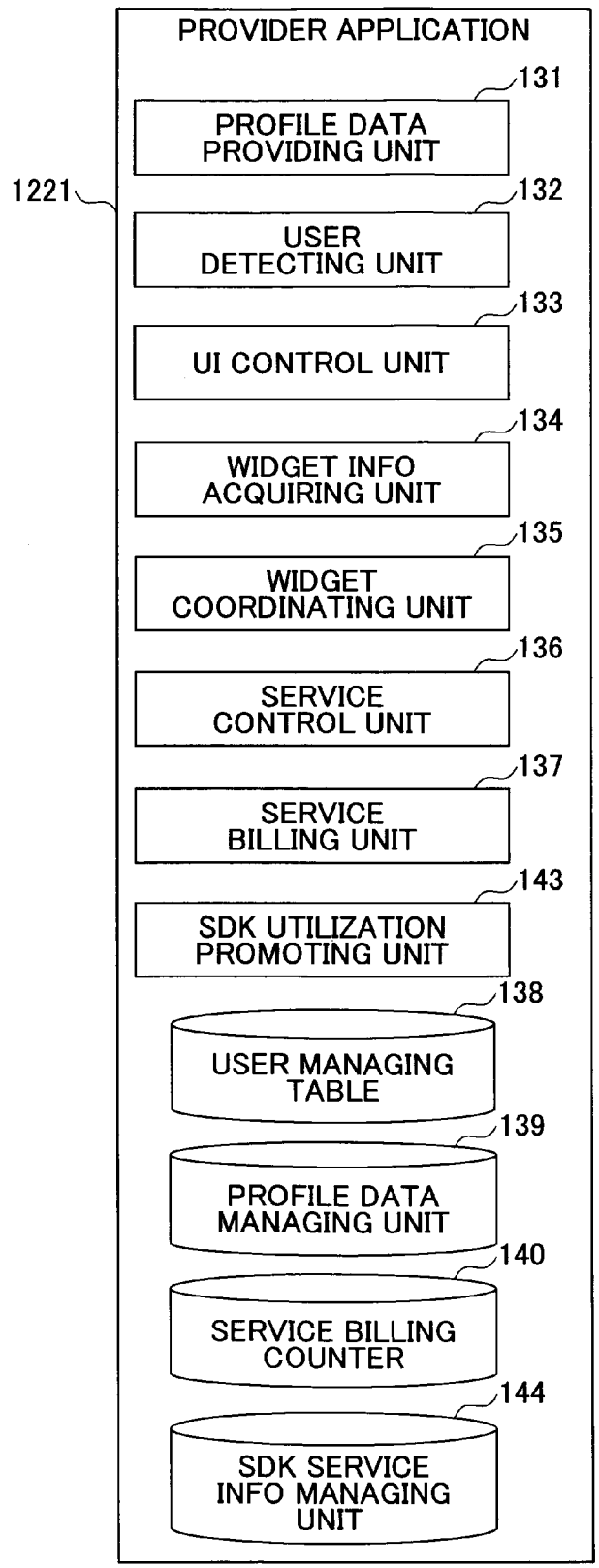
FIG. 32 is a block diagram of a functional structure of a provider application according to the sixth embodiment.

FIG. 32 is a block diagram of a functional structure of the provider application 1221 according to the sixth embodiment. In FIG. 32, units similar to corresponding units of FIG. 1 are designated with similar reference numerals and their description is omitted. In FIG. 32, a SDK utilization promoting unit 143 and a SDK service information managing unit 144 are added. The SDK utilization promoting unit 143 controls a process for promoting the utilization of the SDK application 122. The SDK service information managing unit 144 provides a storage area in the HDD 114 in which the SDK service information is recorded. The SDK service information may include information about a service provided by the SDK application 122 that is on sale.

In accordance with the sixth embodiment, the process sequence upon starting up of the widget manager 22 and the widget 21 is as described with reference to FIG. 5. In step S103, profile data depicted in FIG. 33 may be registered in the profile data managing unit 228. FIG. 33 illustrates an example of the profile data registered in the profile data managing unit of the widget manager. In FIG. 33, the service category of the services by the OCR application 1222 and the translation application 1223 is "Web service". Namely, these services are not provided by the image forming apparatus 10. The profile data of these services are not acquired from the provider application 1221 in steps S101 and S102, but rather downloaded from the download server 60, together with the scan translation widget 21c. In the profile data depicted in FIG. 33, what is newly acquired from the provider application 1221 and then registered is only the profile data of the scan service provided by the scan application 1211 (i.e., profile data with the service ID "scan001").

Figure 34:
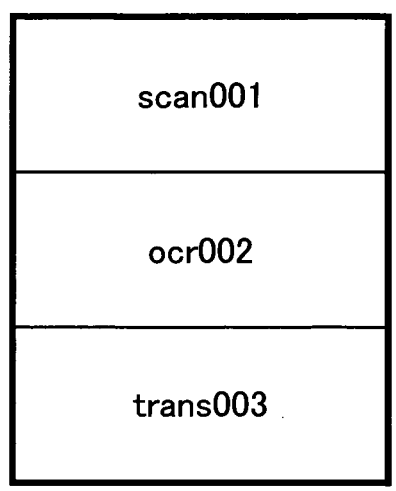
FIG. 34 illustrates an example of utilization-planned service information according to the sixth embodiment.

Referring to FIG. 5, in step S104, the coordinating unit 213 of the scan translation widget 21c may transmit utilization-planned service information depicted in FIG. 34 to the service recommend unit 222 of the widget manager 22. FIG. 34 illustrates an example of the structure of the utilization-planned service information in accordance with the sixth embodiment. As illustrated, in the scan translation widget 21c according to the sixth embodiment, with regard to the OCR service and the translation service, services provided by the OCR application 1222 and the translation application 1223 in the free service server 50 are designated objects of utilization by default. This is because it is the desire of the seller of the image forming apparatus 10 to have the convenience of the OCR application 1222 and the translation application 1223 recognized by end-users via the scan translation widget 21c.

Thereafter, an optimum service is determined by the service recommend unit 222 (S105). Preferably, in accordance with the sixth embodiment, the determination process is based on a logic such that, when a service included in the utilization-planned service information cannot be utilized, an optimum service can be selected from other services. In this way, the chances of utilization of the service by the OCR application 1222 or the translation application 1223 can be increased. Alternatively, the seller of the SDK application 122 may set high evaluation values of the profile data of the OCR application 1222 and the translation application 1223 in terms of quality, cost, or delivery.

Figure 35:
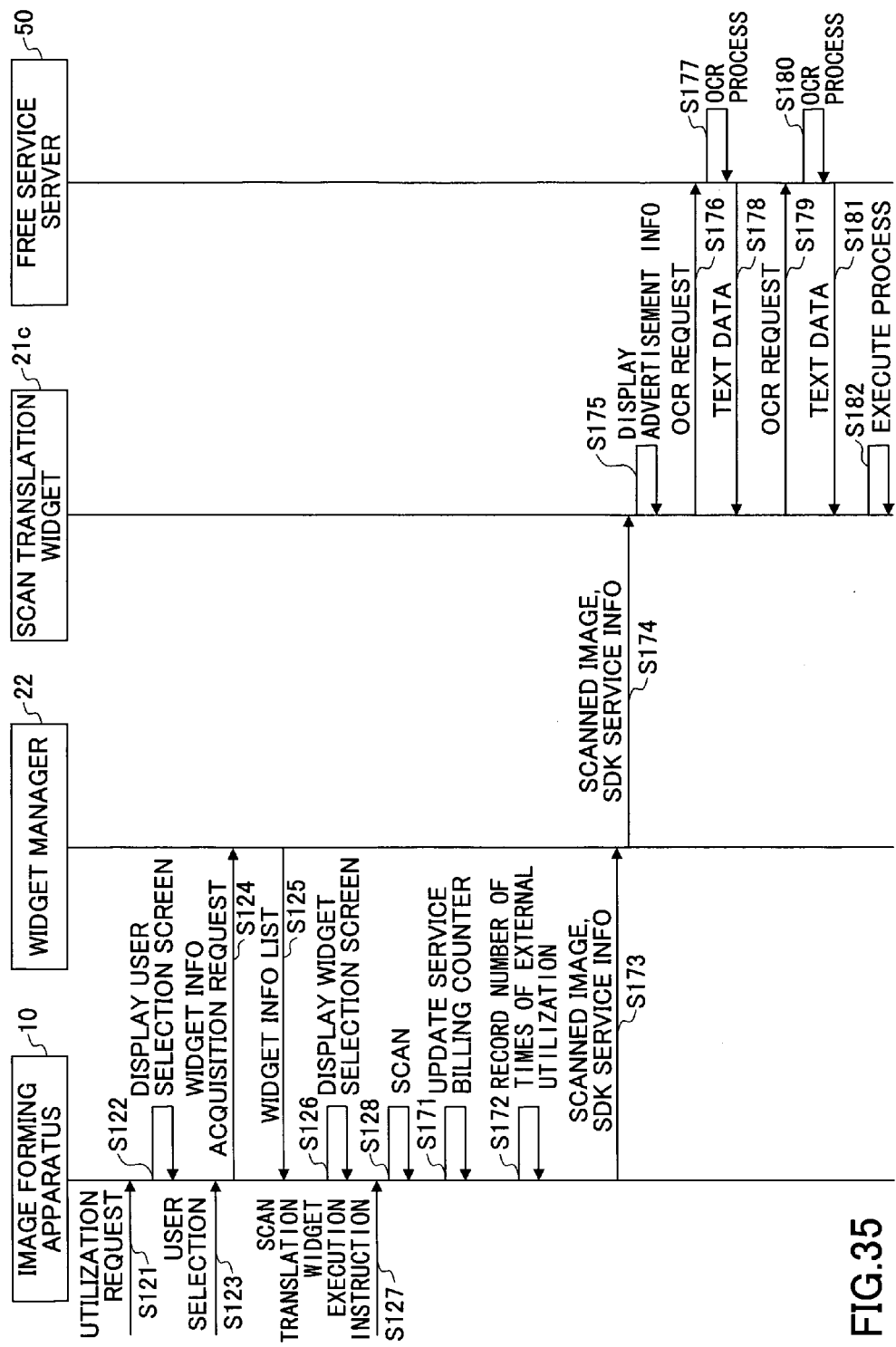
FIG. 35 is a sequence diagram of a process sequence of a scan translation widget according to the sixth embodiment.

Hereafter, a process sequence of the scan translation widget 21c is described in which a service included in the utilization-planned service information is adopted as is as the object of utilization. FIG. 35 is a sequence diagram of a process sequence involving the scan translation widget according to the sixth embodiment. In FIG. 35, steps similar to the corresponding steps of FIG. 26 are designated with similar step numbers and their description is omitted.

In step S125, widget information of the scan translation widget 21c depicted in FIG. 36 may be transmitted to the widget information acquiring unit 134 of the provider application 1221 and registered in the profile data managing unit 139. FIG. 36 illustrates an example of the structure of the widget information of the scan translation widget 21c that is transmitted from the widget manager to the provider application. In the service utilization information of the widget information, the utilization-planned service information of FIG. 34 is adopted as is. Because of the widget information (current widget information) depicted in FIG. 36, the process in step S171 and in subsequent steps of FIG. 35 is different from that of FIG. 26. Specifically, the service control unit 136, based on the fact that the provider names included in the second and third entries of the service utilization information in the current widget information (see FIG. 36) do not correspond to the provider names of the services in the image forming apparatus 10, determines that all of the services requested of the provider application 1221 have been executed. Thus, the service control unit 136 requests the service billing unit 137 to perform a billing process for the services executed. In response to the request, the service billing unit 137 updates the billing counter for the service ID "scan001" (S171).

When the billing process is completed, the service control unit 136 sends a process request to the SDK utilization promoting unit 143. The SDK utilization promoting unit 143, based on the service utilization information in the current widget information and the SDK service information SDK registered in the service information managing unit 144, records the number of times of external utilization in the SDK service information managing unit 144 as needed (S172).

FIG. 37 illustrates an example of the structure of the SDK service information in the SDK service information managing unit 144. In the illustrated example, the SDK service information includes the columns for service ID, type identifier, provider name, advertising information, and the number of times of external utilization for each service that the SDK application 122 on sale can provide (i.e., the services provided by the SDK application 122 that its seller desires to have made available in the image forming apparatus 10). The "number of times of external utilization" indicates the number of times a service has been utilized outside the image forming apparatus 10. The "advertising information" may include a message for enabling the utilization of the service (i.e., promoting the installation of the SDK application 122) in the image forming apparatus 10. Data format of the SDK service information is not particularly limited, as in the case of the advertising information in the advertisement attribute information according to the fifth embodiment.

The SDK utilization promoting unit 143 searches the SDK service information managing unit 144 for SDK service information whose service ID, type identifier, and provider name correspond to those of the services (i.e., the OCR service by the OCR application 1222 and the translation service by the translation service) that have not been executed in the image forming apparatus 10, among the services included in the service utilization information in the current widget information. The SDK service information whose type identifier alone corresponds may be retrieved. The SDK utilization promoting unit 143 then increments (updates) the number of times of external utilization in the retrieved SDK service information. Namely, the number of times of external utilization is incremented for the SDK service information of the SDK application 122 that is not installed in the image forming apparatus 10 and that provides a service in the free service server.

In the SDK service information where the number of times of external utilization has been updated, if there is the SDK service information whose number of times of external utilization exceeds a predetermined threshold, the SDK utilization promoting unit 143 outputs the service information to the service control unit 136 as well as outputting a process end notice. If there is no SDK service information whose number of times of external utilization exceeds the predetermined threshold, the SDK utilization promoting unit 143 only outputs the process end notice to the service control unit 136. In accordance with the present embodiment, it is assumed that the SDK service information (SDK service information of the translation application 1223) in line 2 of FIG. 37 is outputted.

In response to the process end notice from the SDK utilization promoting unit 143, the service control unit 136 inputs the scanned image, the final service ID ("scan001"), and the SDK service information outputted from the SDK utilization promoting unit 143 to the widget coordinating unit 135. Thereafter, the widget coordinating unit 135 transmits the scanned image, the final service ID, and the SDK service information to the widget relaying URL contained in the current widget information (S173). The scanned image, final service ID, and SDK service information addressed to the widget relaying URL is received by the relaying unit 226 of the widget manager 22. The relaying unit 226 then acquires the widget information corresponding to the widget relaying URL from the widget information managing table 227, and transfers the scanned image, final service ID, and SDK service information to the widget address contained in the widget information (S174).

The scanned image, final service ID, and SDK service information addressed to the widget address are received by the coordinating unit 213 of the scan translation widget 21*c*. The coordinating unit 213, when it receives the SDK service information, inputs the SDK service information to the widget UI unit 211. The widget UI unit 211 causes the advertising information contained in the SDK service information to be displayed on the display device 206 (S175). The advertising information may include an advertise message for the translation application 1223. For example, the message may extol merits of introducing the translation application 1223.

Thereafter, the coordinating unit 213 inputs the received scanned image and the final service ID into the logic unit 214 of the scan translation widget 21*c*. The logic unit 214, based on the final service ID, recognizes the completion of the scan service, and transmits an OCR process execution request to the OCR application 1222 of the free service server 50 based on the service utilization information (see FIG. 36) (S176). The OCR process execution request includes the scanned image. The OCR process execution request may be based on the interface information contained in the profile data of the OCR application 1222. Thereafter, the OCR application 1222 executes an OCR process on the scanned image (S177), and returns resultant text data to the logic unit 214 of the scan translation widget 21*c* (S178).

Then, the logic unit 214, based on the service utilization information (see FIG. 36), transmits a translation process execution request to the translation application 1223 of the free service server 50 (S179). The translation process execution request includes the text data. The translation process execution request is based on the interface information included in the profile data of the translation application 1223. Thereafter, the translation application 1223 executes a translation process on the text data (S181), and returns resultant translation result data to the logic unit 214 of the scan translation widget 21*c* (S182). The logic unit 214 then executes a predetermined process (logic) using the translation result data as a processed object (S183).

Thus, in accordance with the sixth embodiment, the presence of the SDK application 122 whose service can be provided to the scan translation widget 21*c* can be made to be recognized by the user. Therefore, by making the scan translation widget 21*c* freely downloadable from the download server 60, and thus making the scan translation widget 21*c* available to a number of end-users, the presence of the OCR application 1222 or the translation application 1223 can be made to be recognized by a number of end-users. As a result, it can be hoped that the end-users, once they recognize the convenience of the OCR application 1222 or the translation application 1223, will make requests to the administrator and the like of the image forming apparatus 10 for introduction (purchasing and installation) of the OCR application 1222 or the translation application 1223 in the image forming apparatus 10. In order to increase the likelihood of introduction of the OCR application 1222 or the translation application 1223, the functions (items that can be set) or expiration date of the services provided by the free service server 50 may be limited.

After the OCR application 1222 or the translation application 1223 is installed on the image forming apparatus 10, they may be automatically selected by the service recommend unit 222 if the evaluation values of their profile data are set high. Thus, no change of the scan translation widget 21*c* by the user before or after installation is necessary.

Thus, by distributing the widget 21, the sales of the SDK application 122 that provides services utilized by the widget 21 can be effectively promoted. While in the foregoing example, the advertising information is displayed when the number of times of external utilization exceeds a threshold, the advertising information may be displayed each time external utilization is detected for a service whose SDK service information is registered in the SDK service information managing unit 144. However, by limiting the display of the advertising information over and above the threshold, the SDK application 122 as an object of advertisement can be limited to those applications with a large number of times of utilization, whereby an enhanced advertising effect can be obtained. Furthermore, the users can be spared of frequent advertisements, which may make them feel unpleasant.

In the foregoing embodiments, sequences of utilization of the image forming apparatus 10 have been described. However, the widget 21 has a high degree of freedom in process sequence, and the present invention is not limited to the process sequences involving utilization of the image forming apparatus 10. For example, the widget 21 may be configured to carry out an OCR process on image data stored in the user terminal 20. Such a process sequence of the widget 21 may not involve coordination with the image forming apparatus 10. However, the selection of an optimum OCR service may utilize the service recommend unit 222 of the widget manager 22. As a result, an optimum OCR service can be selected from among plural OCR services provided in the user terminal 20 (local environment) or on a network in accordance with a predetermined reference, and the function of the widget 21 can be performed.

Although this invention has been described in detail with reference to certain embodiments, variations and modifications exist within the scope and spirit of the invention as described and defined in the following claims.

The present application is based on the Japanese Priority Applications No. 2009-062055 filed Mar. 13, 2009 and No. 2009-062057 filed Mar. 13, 2009, the entire contents of which are hereby incorporated by reference.

The invention claimed is:

1. An information processing apparatus comprising:
a processor including:
a receiving unit configured to receive a utilization request for a service provided by a computer;
a service attribute information storage unit configured to store, for each service, service attribute information, the service attribute information including information indicating a type of the service and evaluation information about contents of the service; and a service recommending unit configured to
search the service attribute information storage unit for the service attribute information concerning the type designated by the utilization request, and
determine a utilization-recommended service based on the evaluation information in the service attribute information from the service attribute information storage unit,
wherein the service attribute information includes, depending on billed amounts at times of utilizing the services that include services for which billings do not take place at times of utilizing the services, information indicating evaluation values of billed amounts, evaluation values of quality, evaluation values of delivery times and locations where the services are provided,
wherein the services have a hierarchical relationship,
wherein the service attribute information of the service for which the service at a lower level in the hierarchical relationship is replaceable includes relating information to the service attribute information of the service at the lower level, and
wherein the service recommending unit is configured to, when the service attribute information of the utilization-recommended service includes the relating information,
acquire the service attribute information of the service at the lower level from the service attribute storage unit based on the relating information,
search the service attribute information storage unit for the service attribute information whose type and location where the service is provided correspond to the type and location where the service is provided of the acquired service attribute information, and
determine a utilization-recommended service at a lower level based on an evaluation value calculated based on the evaluation value of a billed amount, the evaluation value of quality and the evaluation value of a delivery time in the service attribute information retrieved from the service attribute information storage unit.

2. The information processing apparatus according to claim 1, wherein the processor further includes a service attribute information acquiring unit configured to
acquire, from an image forming apparatus with which the information processing apparatus can communicate, service attribute information of a service that the image forming apparatus can provide, and
record the acquired service attribute information in the service attribute information storage unit,
wherein the service attribute information storage unit also stores service attribute information of a service that is provided outside the image forming apparatus.

3. The information processing apparatus according to claim 2, wherein the processor further includes a utilization history record unit configured to record, in response to a notice of utilization of the service provided outside the image forming apparatus, a history of utilization of the service in utilization history storage unit.

4. The information processing apparatus according to claim 1,
wherein the service attribute information includes information identifying a provider of each service, and
wherein the service recommending unit is configured to, when the service attribute information of the utilization-recommended service includes the relating information, search the service attribute information storage unit for service attribute information whose type, location and provider correspond to the type, location and provider of the acquired service attribute information.

5. The information processing apparatus according to claim 1, wherein the processor further includes a service attribute information acquiring unit configured to
acquire, from an image forming apparatus with which the information processing apparatus can communicate, service attribute information of a service that the image forming apparatus can provide and the service attribute information of the lower-level service, and
record the acquired service attribute information in the service attribute information storage unit.

6. An information processing method performed by an information processing apparatus, the method comprising:
receiving a utilization request for a service provided by a computer;
storing, for each service, service attribute information in a service attribute information storage unit, the service attribute information including information indicating a type of the service and evaluation information about the contents of the service;
searching the service attribute information storage unit for the service attribute information concerning the type designated by the utilization request; and
determining a utilization-recommended service based on the evaluation information in the service attribute information from the service attribute information storage unit,
wherein the service attribute information includes, depending on billed amounts at times of utilizing the services that include services for which billings do not take place at times of utilizing the services, information indicating evaluation values of billed amounts, evaluation values of quality, evaluation values of delivery times and locations where the services are provided,
wherein the services have a hierarchical relationship,
wherein the service attribute information of the service for which the service at a lower level in the hierarchical relationship is replaceable includes relating information to the service attribute information of the service at the lower level, and
wherein the method further comprises, when the service attribute information of the utilization-recommended service includes the relating information,
acquiring the service attribute information of the service at the lower level from the service attribute storage unit based on the relating information;
searching the service attribute information storage unit for the service attribute
information whose type and location where the service is provided correspond to the type and location where the service is provided of the acquired service attribute information; and
determining a utilization-recommended service at a lower level based on an
evaluation value calculated based on the evaluation value of a billed amount, the evaluation value of quality and the evaluation value of a delivery time in the service attribute information retrieved from the service attribute information storage unit.

7. The information processing method according to claim 6, further comprising:
acquiring, from an image forming apparatus with which the information processing apparatus can communicate, service attribute information of a service that the image forming apparatus can provide;

recording the acquired service attribute information in the service attribute information storage unit; and storing service attribute information of a service that is provided outside the image forming apparatus in the service attribute information storage unit.

8. The information processing method according to claim 6, further comprising:

acquiring, from an image forming apparatus with which the information processing apparatus can communicate, service attribute information of a service that the image forming apparatus can provide and the service attribute information of the lower-level service; and recording the acquired service attribute information in the service attribute information storage unit.

9. An image forming apparatus comprising:

a first processor including:

a first service attribute information storage unit configured to store service attribute information associated with each of plural services that can be provided by the image forming apparatus, the service attribute information including information indicating a type of the service and evaluation information about the contents of the service;

a service attribute information providing unit configured to transmit, in response to a request from an information processing apparatus with which the image forming apparatus can communicate, identifying information stored in the first service attribute information storage unit to the information processing apparatus;

a service request receiving unit configured to receive a service execution request including the identifying information from the information processing apparatus;

a service control unit configured to control an execution of the service identified by the identifying information included in the service execution request; and a billing unit configured to record billing information, corresponding to a number of the services executed, in a billing information storage unit, wherein a predetermined function is realized by utilizing a plurality of the services, wherein the service attribute information stored in the first service attribute information storage unit includes a cost of utilization associated with a corresponding service, and wherein the information processing apparatus includes:

a receiving unit configured to receive a utilization request for a service provided by a computer;

a second service attribute information storage unit configured to store service attribute information for each of the plural services; and a service recommending unit configured to search the service attribute information storage unit for the service attribute information concerning the type designated by the utilization request, and determine a utilization-recommended service based on the evaluation information in the service attribute information from the service attribute information storage unit, wherein the service attribute information includes, depending on billed amounts at times of utilizing the services that include services for which billings do not take place at times of utilizing the services, information indicating evaluation values of billed amounts, evaluation values of quality, evaluation values of delivery times and locations where the services are provided, the services having a hierarchical relationship, wherein the service attribute information of the service of which the service at a lower level in the hierarchical relationship is replaceable includes relating information to the service attribute information of the service at the lower level, and wherein the service recommending unit is configured to, when the service attribute information of the utilization-recommended service includes the relating information, acquire the service attribute information of the service at the lower level from the service attribute storage unit based on the relating information, search the service attribute information storage unit for the service attribute information whose type and location where the service is provided correspond to the type and location where the service is provided of the acquired service attribute information, and determine a utilization-recommended service at a lower level based on an evaluation value calculated based on the evaluation value of a billed amount, the evaluation value of quality and the evaluation value of a delivery time in the service attribute information retrieved from the service attribute information storage unit.

10. The image forming apparatus according to claim 9, wherein the billing information storage units includes a billing counter for each service, and wherein the billing unit updates the billing counter upon execution of the corresponding service.

11. The image forming apparatus according to claim 9, wherein the execution request includes information indicating the type of the requested service, and wherein the first processor of the image forming apparatus further includes:

a first advertising information storage unit configured to store, for each service whose utilization is to be advertised, information indicating the type of the service and first advertising information advertising utilization of the service; and a first advertising information transmitting unit configured to acquire, from the first advertising information storage unit, the first advertising information of which the type corresponds to the type of the requested service, and configured to transmit the acquired first advertising information to the information processing apparatus.

12. The image forming apparatus according to claim 9, wherein the execution request includes information indicating the type of the requested service, and wherein the first processor of the image forming apparatus further includes:

a second advertising information storage unit configured to store, for each service that is desired to be enabled for utilization in the image forming apparatus, the information indicating the type and second advertising information for enabling utilization of the service in the image forming apparatus; and a second advertising information transmitting unit configured to acquire, from the second advertising information storage unit, the second advertising information whose type corresponds to the type of the requested service, and configured to transmit the acquired second advertising information to the information processing apparatus.

\* \* \* \* \*